United States Patent
Jung et al.

(10) Patent No.: US 9,814,025 B2
(45) Date of Patent: Nov. 7, 2017

(54) METHOD OF REPORTING INFORMATION ON UE STATE PERFORMED BY UE IN WIRELESS COMMUNICATION SYSTEM AND DEVICE FOR SUPPORTING SAID METHOD

(71) Applicant: LG ELECTRONICS INC., Seoul (KR)

(72) Inventors: Sunghoon Jung, Seoul (KR); Youngdae Lee, Seoul (KR); Sungjun Park, Seoul (KR); Seungjune Yi, Seoul (KR)

(73) Assignee: LG Electronics Inc., Seoul (KR)

( * ) Notice: Subject to any disclaimer, the term of this patent is extended or adjusted under 35 U.S.C. 154(b) by 91 days.

(21) Appl. No.: 14/647,771

(22) PCT Filed: Nov. 29, 2013

(86) PCT No.: PCT/KR2013/011025
§ 371 (c)(1),
(2) Date: May 27, 2015

(87) PCT Pub. No.: WO2014/084675
PCT Pub. Date: Jun. 5, 2014

(65) Prior Publication Data
US 2015/0319744 A1 Nov. 5, 2015

Related U.S. Application Data

(60) Provisional application No. 61/731,455, filed on Nov. 29, 2012.

(51) Int. Cl.
*H04W 72/04* (2009.01)
*H04W 76/04* (2009.01)
(Continued)

(52) U.S. Cl.
CPC ......... *H04W 72/0406* (2013.01); *H04W 8/22* (2013.01); *H04W 24/10* (2013.01);
(Continued)

(58) Field of Classification Search
CPC . H04W 72/0406; H04W 76/00; H04W 76/02; H04W 76/028; H04W 7/046; H04W 24/00; H04W 24/02
See application file for complete search history.

(56) References Cited

U.S. PATENT DOCUMENTS 7,574,226 B2 * 8/2009 Takano ............... H04W 76/046
455/450
7,916,675 B2 * 3/2011 Dalsgaard ............... H04L 12/12
370/311

(Continued)

FOREIGN PATENT DOCUMENTS

KR 10-2003-0054162 A 7/2003
KR 10-2006-0131655 A 12/2006
(Continued)

*Primary Examiner* — Warner Wong
(74) *Attorney, Agent, or Firm* — Dentons US LLP

(57) ABSTRACT

A method of reporting information on a UE state performed by UE in a wireless communication system is provided. The method includes: generating information on a UE state; transmitting the information on the UE state to a network; obtaining, from the network, configuration information generated based on the information on the UE state; and operating based on the configuration information. The information on the UE state includes at least one of UE activity specifying a frequency at which a UE communicates with the network, and an activity state of the UE determined based on the UE activity.

13 Claims, 15 Drawing Sheets

(51) Int. Cl.
  *H04W 76/02* (2009.01)
  *H04W 8/22* (2009.01)
  *H04W 24/10* (2009.01)
  *H04W 88/02* (2009.01)
  *H04W 88/08* (2009.01)
  *H04W 88/18* (2009.01)
  *H04W 84/02* (2009.01)
  *H04W 8/18* (2009.01)

(52) U.S. Cl.
  CPC ......... *H04W 76/02* (2013.01); *H04W 76/046* (2013.01); *H04W 8/18* (2013.01); *H04W 76/028* (2013.01); *H04W 76/048* (2013.01); *H04W 84/02* (2013.01); *H04W 88/02* (2013.01); *H04W 88/08* (2013.01); *H04W 88/18* (2013.01)

(56) References Cited

U.S. PATENT DOCUMENTS

| | | | |
|---|---|---|---|
| 2008/0101268 A1* | 5/2008 | Sammour | H04W 76/048 370/311 |
| 2008/0182594 A1* | 7/2008 | Flore | H04W 76/046 455/458 |
| 2009/0023436 A1* | 1/2009 | Wu | H04W 24/10 455/419 |
| 2009/0168748 A1* | 7/2009 | Kishiyama | H04W 56/0005 370/350 |
| 2011/0194437 A1* | 8/2011 | Song | H04W 76/02 370/252 |
| 2011/0319115 A1* | 12/2011 | Racz | H04W 24/10 455/514 |
| 2012/0014306 A1* | 1/2012 | Pelletier | H04W 52/0216 370/311 |
| 2012/0051289 A1 | 3/2012 | Dwyer et al. | |
| 2012/0082051 A1* | 4/2012 | Kim | H04W 24/10 370/252 |
| 2012/0115469 A1* | 5/2012 | Chen | H04W 36/0094 455/434 |
| 2012/0120815 A1* | 5/2012 | Anderson | H04W 76/048 370/252 |
| 2012/0178465 A1* | 7/2012 | Lin | H04W 24/10 455/450 |
| 2013/0201851 A1* | 8/2013 | Chou | H04W 24/02 370/252 |
| 2014/0133465 A1* | 5/2014 | Johansson | H04W 24/04 370/332 |
| 2014/0146691 A1* | 5/2014 | Soliman | H04W 24/10 370/252 |
| 2014/0146732 A1* | 5/2014 | Olufunmilola | H04W 24/10 370/311 |

FOREIGN PATENT DOCUMENTS

KR  10-2007-0066975 A  6/2007
KR  10-2008-0018104 A  2/2008

* cited by examiner

METHOD OF REPORTING INFORMATION ON UE STATE PERFORMED BY UE IN WIRELESS COMMUNICATION SYSTEM AND DEVICE FOR SUPPORTING SAID METHOD

This application is a 35 U.S.C. §371 National Stage Entry of International Application No. PCT/KR2013/011025 filed Nov. 29, 2013, which claims benefit of and priority to U.S. Provisional Application No. 61/731,455 filed Nov. 29, 2012, both of which are incorporated by reference for all purposes as if fully set forth herein.

BACKGROUND OF THE INVENTION

Field of the Invention

The present invention relates to wireless communication and, more particularly, to a method of reporting information on a user equipment (UE) state performed by UE in a wireless communication system and a device for supporting the same.

Related Art

3GPP (3rd Generation Partnership Project) LTE (long term evolution) which is improvement of UMTS (Universal Mobile Telecommunications System) has been introduced as 3GPP release 8. The 3GPP LTE uses OFDMA (orthogonal frequency division multiple access) in a downlink, and uses SC-FDMA (Single Carrier-frequency division multiple access) in an uplink. The 3GPP LTE adopts MIMO (multiple input multiple output) having maximum four antennas. Recently, a discussion of 3GPP LTE-A (LTE-Advanced) which is the evolution of the 3GPP LTE is in progress.

UE establishes connection with a network to enter a connection state. The connected UE may receive a service by transmitting/receiving data to and from the network.

When the UE needs frequent data transmission/reception, the UE may be required to frequently maintain a connection state with the network long. In the above environment, the network provides signaling for connection establishment so that the UE may maintain a connection state with the network.

When the UE do not want to receive a service through frequent data transmission/reception, or the UE is operated by regarding reduction of power consumption as important as compared with data transmission/reception, the UE may sufficiently maintain a connection state with the network for a short time period. In the above environment, the UE may maintain an idle state.

When the network optimizes or efficiently controls data transmission/reception, control signaling and/or an operation of the UE associated with power management, there may be a need to provide information of UE state to the network.

SUMMARY OF THE INVENTION

The present invention provides a method of reporting information on a UE state performed by UE in a wireless communication system and a device for supporting the same.

In an aspect, a method of reporting information on a user equipment (UE) state performed by UE in a wireless communication system is provided. The method comprises generating information on a UE state, transmitting the information on the UE state to a network, obtaining, from the network, configuration information generated based on the information on the UE state and operating based on the configuration information. The information on the UE state includes at least one of UE activity specifying a frequency at which a UE communicates with the network, and an activity state of the UE determined based on the UE activity.

The activity of the UE may be determined based on the number when the UE transitions a radio resource control (RRC) state during at least one recent sub-frame.

The activity of the UE may be determined based on a continuation time when the UE is operated in an RRC connection state entry just before RRC idle state.

The activity of the UE may be determined based on at least one of an average RRC idle state continuation time and an average RRC connection state continuation time with respect to a specific number of recent RRC connection states.

The activity of the UE may be determined based on the number of active sub-frames for communication of the UE during a specific time interval.

The activity of the UE may be determined based on a rate of at least one active sub-frame for communication of the UE with respect to the number of latest specific sub-frames.

The activity of the UE may be determined based on whether a traffic activated in the UE is a delay sensitive traffic.

The activity of the UE may be determined based on a latest data transmission/reception generation time point of the UE.

The configuration information may comprise a parameter associated with a radio resource control (RRC), and the parameter may be configured so that an RRC state of the UE according to at least one of the activity state of the UE and the activity of the UE.

The operating based on the configuration information may comprise RRC connection establishment with the network using the parameter.

The configuration information may comprise a discontinuous reception (DRX) parameter, and the DRX parameter may be configured so that a control channel monitoring time of the UE is controlled according to at least one of the activation state of the UE and the activity of the UE.

The operating based on the configuration information may comprise monitoring a downlink control channel according to the control channel monitoring time of the UE which is specified according to the DRX parameter and performing data transmission/reception with the network according to scheduling information acquired through the downlink control channel.

The method may further comprise transmitting an UE state information usable indicator indicating that there is information on UE state to be reported and receiving an UE state information report request from the network.

The information on the UE state may be transmitted as a response to the UE state information report request.

In another aspect, a wireless apparatus operating in a wireless communication system is provided. The wireless apparatus comprises a Radio Frequency (RF) unit that sends and receives radio signals and a processor that is functionally coupled to the RF unit. The processor is configured to generate information on a UE state to transmit the information on the UE state to a network, to obtain, from the network, configuration information generated based on the information on the UE state and to operate based on the configuration information. The information on the UE state includes at least one of UE activity specifying a frequency at which a UE communicates with the network, and an activity state of the UE determined based on the UE activity.

In accordance with the method of reporting information on a UE state performed by UE in a wireless communication system and a device for supporting the same according to an embodiment of the present invention, the network may recognize UE activity and/or an activity state of the UE through the information on the UE state. Based on this, the network may generate configuration information by taking into consideration RRC configuration optimized in the UE and/or wireless resource assignment to provide the generated configuration information the UE. Based on this, the network may generate configuration information by taking into consideration RRC configuration optimized in the UE and/or wireless resource assignment to provide the generated configuration information of the UE. The UE may be operated according to the configuration information to perform an optimized RRC transition relation operation and to receive assignment of an optimized wireless resource. Accordingly, unnecessary signaling between the UE and the network may be and data transmission/reception quality of the UE is improved so that improved service may be provided. The UE may be operated according to the configuration information to perform an optimized RRC transition relation operation and to receive assignment of an optimized wireless resource. Accordingly, unnecessary signaling between the UE and the network may be and data transmission/reception quality of the UE is improved so that improved service may be provided.

DESCRIPTION OF EXEMPLARY EMBODIMENTS

Figure 1:
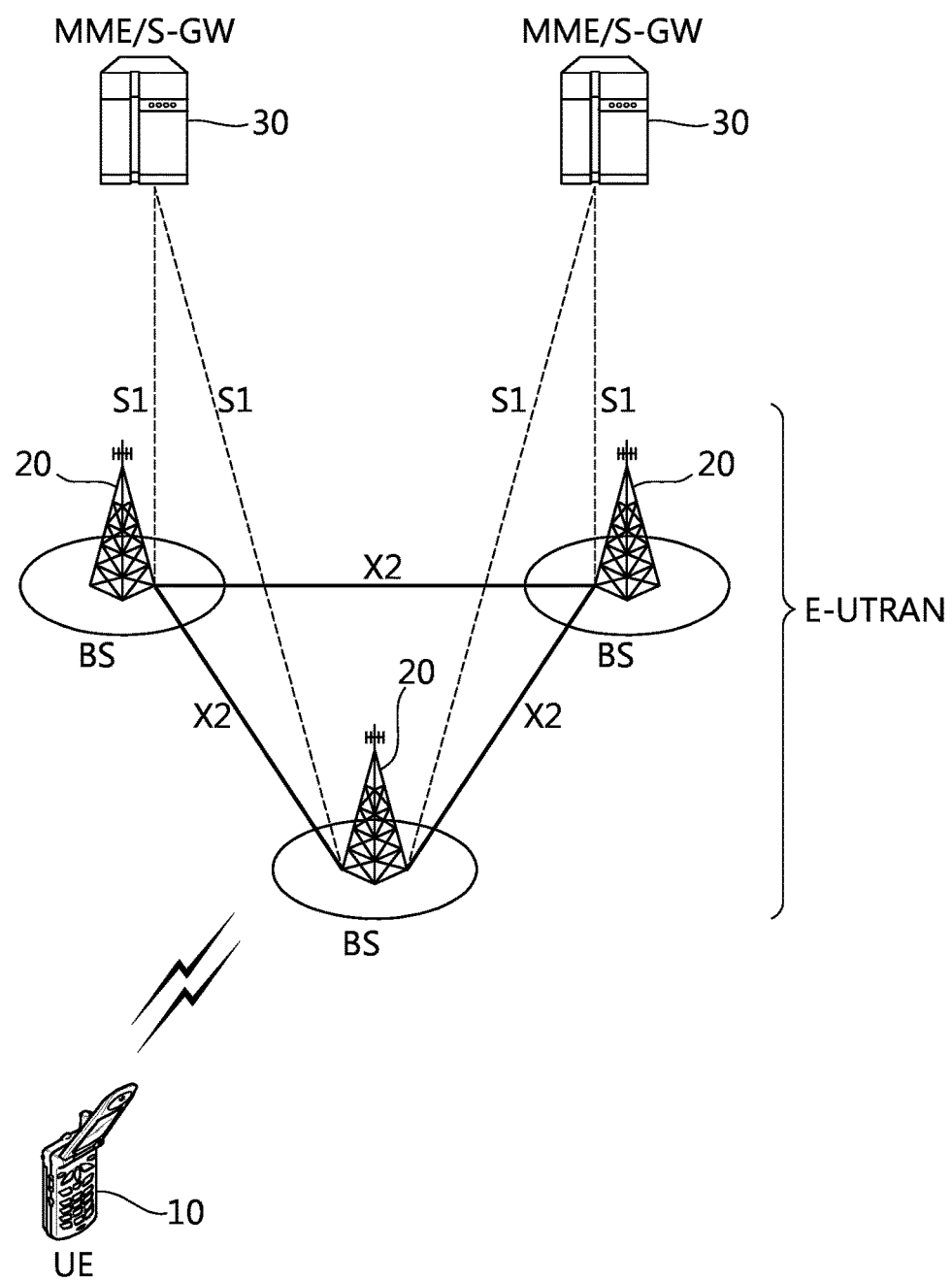
FIG. 1 illustrates a wireless communication system to which the present invention is applied.

FIG. 1 illustrates a wireless communication system to which the present invention is applied. The wireless communication system may be called an evolved-UMTS terrestrial radio access network (E-UTRAN), or a long term evolution (LTE)/LTE-A system.

The E-UTRAN includes a base station (BS) 20 which provides a control plane and a user plane to user equipment (UE) 10. The UE 10 may be fixed or have mobility, and may be referred to as other terms such as a mobile station (MS), a user terminal (UT), a subscriber station (SS), a mobile terminal (MT), and a wireless device. The BS 20 generally represents a fixed station that communicates with the UE 10 and may be referred to as other terms such as an evolved-NodeB (eNB), a base transceiver system (BTS), and an access point.

The BSs 20 may be connected to each other through an X2 interface. The BS 20 is connected with an evolved packet core (EPC) 30 through an S1 interface, and more particularly, connected with a mobility management entity (MME) through an S1-MME and a serving gateway (S-GW) through an S1-U.

The EPC 30 is constituted by the MME, the S-GW, and a packet data network-gateway (P-GW). The MME has access information of the UE or information regarding capacity of the UE, and the information is frequently used in mobility management of the UE. The S-GW is a gateway having the E-UTRAN as an end point, and the P-GW is a gateway having the PDN as an end point.

Layers of a radio interface protocol between the UE and the network may be divided into a first layer L1, a second layer L2, and a third layer L3 based on three lower layers of an open system interconnection (OSI) standard model which is widely known in the communication system, and among them, a physical layer to which the first layer belongs provides an information transfer service using a physical channel, and a radio resource control (RRC) layer positioned on the third layer serves to control a radio resource between the UE and the network. To this end, the RRC layer exchanges an RRC message between the UE and the network.

Figure 2:
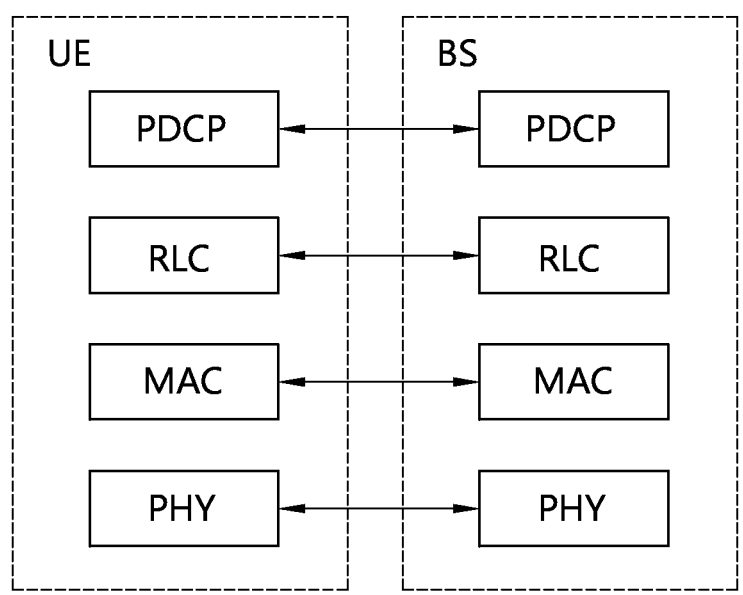
FIG. 2 is a block diagram illustrating a radio protocol architecture for a user plane.
Figure 3:
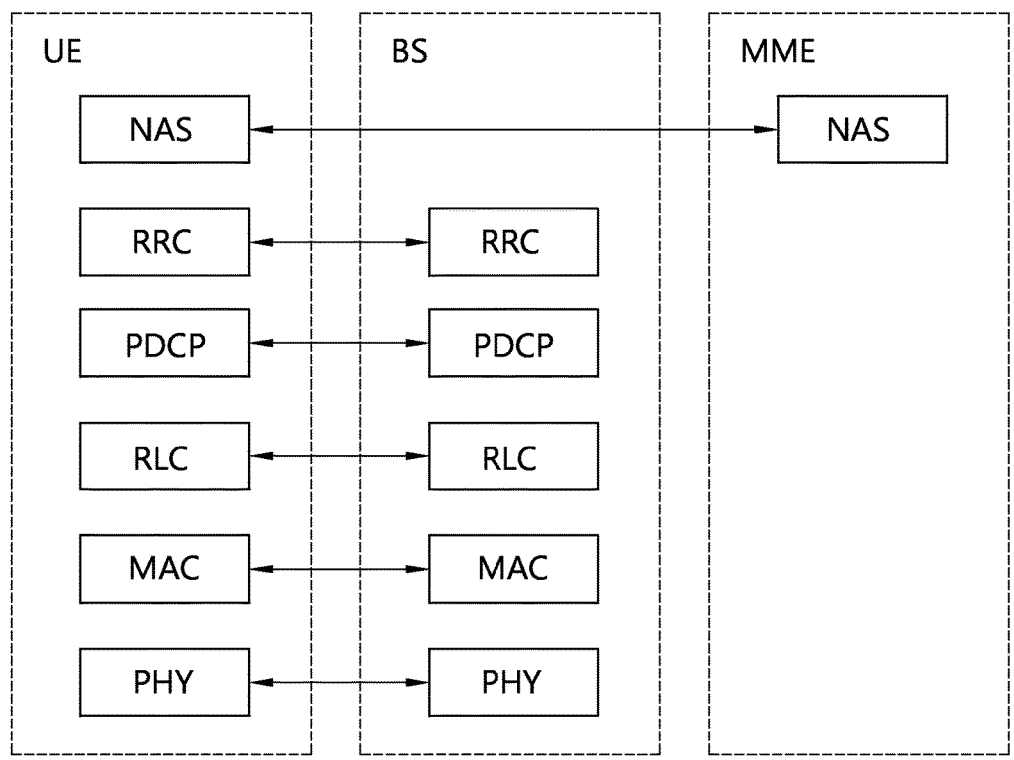
FIG. 3 is a block diagram illustrating a radio protocol architecture for a control plane.

FIG. 2 is a block diagram illustrating a radio protocol architecture for a user plane. FIG. 3 is a block diagram illustrating a radio protocol architecture for a control plane. The user plane is a protocol stack for user data transmission, and the control plane is a protocol stack for control signal transmission.

Referring to FIGS. 2 and 3, a physical (PHY) layer provides an information transfer service to an upper layer by using a physical channel. The PHY layer is connected with a medium access control (MAC) layer which is the upper layer through a transport channel. Data move between the MAC layer and the PHY layer through the transport channel. The transport channel is classified according to how the data is transmitted through a radio interface with any characteristic.

The data move between different PHY layers, that is, the PHY layers of the transmitter and the receiver through the physical channel. The physical channel may be modulated by an orthogonal frequency division multiplexing (OFDM) scheme, and use a time and a frequency as the radio resource.

A function of the MAC layer includes mapping between a logical channel and a transport channel and multiplexing/demultiplexing to a transport block provided to the physical channel on the transport channel of a MAC service data unit (SDU) which belongs to the logical channel. The MAC layer provides a service to a radio link control (RLC) layer through the logical channel.

A function of the RLC layer includes concatenation, segmentation, and reassembly of the RLC SDU. In order to secure various quality of services (QoS) required by a radio bearer (RB), an RLC layer provides three operation modes of a transparent mode (TM), an unacknowledged mode (UM), and an acknowledged mode (AM). The AM RLC provides an error correction through an automatic repeat request (ARQ).

The radio resource control (RRC) layer is defined only in the control plane. The RRC layer is related with configuration, re-configuration, and release of the RBs to serve to control the logical channel, the transport channel, and the physical channels. The RB means a logic path provided by a first layer (PHY layer) and a second layer (MAC layer, RLC layer, or PDCP layer) in order to transfer the data between the UE and the network.

A function of a packet data convergence protocol (PDCP) layer in the user plane includes transfer, header compression, and ciphering of the user data. A function of the PDCP layer in the control plane includes transfer and ciphering/integrity protection of control plane data.

The configuration of the RB means a process of defining characteristics of the radio protocol layer and the channel in order to provide a specific service and configuring each detailed parameter and operation method. The RB may be divided into a signaling RB (SRB) and a data RB (DRB) again. The SRB is used as a path for transmitting an RRC message in the control plane, and the DRB is used as a path for transporting user data in the user plane.

When RRC connection is established between the RRC layer of the UE and the RRC layer of the E-UTRAN, the UE is in an RRC connected state, and if not, the UE is in an RRC idle state.

A downlink transport channel for transporting the data to the UE from the network includes a broadcast channel (BCH) for transporting system information and a downlink shared channel (SCH) for transporting user traffic or a control message. The traffic or the control message of a downlink multicast or broadcast service may be transported through the downlink SCH, or may be transported through a separate downlink multicast channel (MCH). Meanwhile, an uplink transport channel for transporting the data from the UE to the network includes a random access channel (RACH) for transporting an initial control message and an uplink shared channel (SCH) for transporting the user traffic or the control message in addition to the RACH.

A logical channel which is above the transport channel and mapped in the transport channel includes a broadcast control channel (BCCH), a paging control channel (PCCH), a common control channel (CCCH), a multicast control channel (MCCH), a multicast traffic channel (MTCH), and the like.

The physical channel is constituted by several OFDM symbols in a time domain and several sub-carriers in a frequency domain. One sub-frame is constituted by a plurality of OFDM symbols in the time domain. The RB as a resource allocation unit is constituted by a plurality of OFDM symbols and a plurality of sub-carriers. Further, each sub-frame may use specific sub-carriers of specific OFDM symbols (for example, first OFDM symbols) of the corresponding sub-frame for the physical downlink control channel (PDCCH), that is, a L1/L2 control channel. A transmission time interval (TTI) is a unit time of sub-frame transmission.

As disclosed in 3GPP TS 36.211 V8.7.0, a physical channel in a 3GPP LTE may be classified into a PDSCH (Physical Downlink Shared Channel) and a PUSCH (Physical Uplink Shared Channel) being a data channel and a PDCCH (Physical Downlink Control Channel), PCFICH (Physical Control Format Indicator Channel), PHICH (Physical Hybrid-ARQ Indicator Channel) and PUCCH (Physical Uplink Control Channel) being a control channel.

A PCFICH transmitted from a first OFDM symbol of a sub-frame carries a CFI (control format indicator) regarding the number of OFDM symbols (that is, the size of a control region) used to transmit control channels in the sub-frame. The UE firstly receives the CFI on a PCFICH, and monitors a PDCCH.

The PDCCH is a downlink control channel and refers to a scheduling channel in that it carries scheduling information. The control information transmitted through the PDCCH refers to downlink control information (DCI). The DCI may include resource assignment of the PDSCH (refers to downlink (DL) grant), resource assignment of the PUSCH (refers to uplink grant), a group of a transmission power control command with respect to individual UEs in an optional UE group and/or activation of a VoIP (Voice over Internet Protocol).

The blind decoding is a scheme which demarks a desired identifier in a CRC (Cyclic Redundancy Check) of a received PDCCH (refers to a candidate PDCCH), and checks a CRC error to determine whether a corresponding PDCCH is a control channel of the blind decoding.

The base station determines a PDCCH format according to a DCI to be sent to the UE and attaches a CRC to the DCI, and masks a unique identifier (refers to an RNTI (Radio Network Temporary Identifier)) according to an owner or a purpose of the PDCCH.

Hereinafter, an RRC state of the UE and an RRC connection method will be described.

The RRC state means whether the RRC layer of the UE is logical-connected with the RRC layer of the E-UTRAN or not, and a case where the RRC layer of the UE is connected with the RRC layer of the E-UTRAN is called a RRC connection state, and a case where the RRC layer of the UE is not connected with the RRC layer of the E-UTRAN is called an RRC idle state. Since the RRC connection exists in the UE in the RRC connection state, the E-UTRAN may determine the existence of the corresponding UE in a cell unit, and as a result, the UE may be efficiently controlled. On the other hand, the UE in the RRC idle state may not be determined by the E-UTRAN, and a core network (CN) is managed by a tracking area unit which is a larger area unit than the cell. That is, in the UE in the RRC idle state, only the existence is determined by a large area unit, and the UE needs to move in the RRC connection state in order to receive a general mobile communication service such as voice or data.

When the user first turns on the power of the UE, the UE first searches a proper cell and then stays in the RRC idle state in the corresponding cell. The UE in the RRC idle state establishes the RRC connection with the E-UTRAN through an RRC connection procedure only when the RRC connection is required, and is transited into the RRC connection state. There are several cases where the UE in the RRC idle state requires the RRC connection, and for example, uplink data transmission is required due to reasons such as user's call attempt, or a response message to a case where a paging message is received from the E-UTRAN is transmitted.

A non-access stratum (NAS) layer positioned above the RRC layer performs functions such as a session management and a mobility management.

In the NAS layer, in order to manage mobility of the UE, two states of EDEPS mobility management-REGISTERED (EMM-REGISTER) and EMM-DEREGISTERED are defined, and the two states are applied to the UE and the MME. The initial UE is in the EMM-DEREGISTERED state, and the UE performs a procedure of registering the UE in the corresponding network through an initial attaching procedure so as to be connected to the network. When the attaching procedure is successfully performed, the UE and the MME are in the EMM-REGISTERED state.

In order to manage signaling connection between the UE and the EPS, two states of an EPS connection management (ECM)-IDLE state and an ECM-CONNECTED state, and the two states are applied to the UE and the MME. When the UE in the ECM-IDLE state is RRC-connected with the E-UTRAN, the corresponding UE becomes in the ECM-CONNECTED state. When the MME in the ECM-IDLE state is S1-connected with the E-UTRAN, the corresponding MME becomes in the ECM-CONNECTED state. When the UE is in the ECM-IDLE state, the E-UTRAN does not have context information of the UE. Accordingly, the UE in the ECM-IDLE state performs a procedure related with the mobility based on the UE such as cell selection or cell reselection without receiving a command of the network. On the contrary, when the UE is in the ECM-CONNECTED state, the mobility of the UE is managed by the command of the network. When a position of the UE in the ECM-IDLE state is different from a position which is known to the network, the UE notifies the corresponding position of the UE to the network through a tracking area updating procedure.

Next, the system information will be described.

The system information includes necessary information which the UE needs to known so as to be connected to the BS. Accordingly, the UE needs to receive all the system information before being connected to the BS, and further, needs to have latest system information at all times. In addition, since the system information is information to be known by all the UE in one cell, the BS periodically transmits the system information. The system information is classified into a Master Information Block (MIB) and a plurality of System Information Blocks (SIBs).

The MIB may include the limited number of the most essential and the most frequent transmitted parameter which is required to be obtained for other information from a cell. The UE firstly search the MIB after downlink synchronization. The MIB may include information such as a downlink channel bandwidth, PHICH setting, an SFN to support synchronization and being operated as a timing reference, and eNB transmission antenna configuration. The MIB may be broadcasted and transmitted on a BCH.

A SIB1 (SystemInformationBlockType1) among included SIBs is transmitted while being included in a "SystemInformationBlockType1". Remaining SIBs except for SIB1 are transmitted while being included in a system information message. The SIBs may be flexibly mapped to the system information message according to a scheduling information list parameter included in the SIB1. However, each SIB is included in a single system information message, and only SIBs having the same scheduling requiring value (e.g. period) may be mapped to the same system information message. Further, an SIB2 (SystemInformationBlockType2) is always mapped to a system information message corresponding to a first entry in the system information message list of the scheduling information list. A plurality of system information messages may be transmitted in the same period. The SIB1 and all system information messages are transmitted on a DL-SCH.

In addition to broadcast transmission, in the E-UTRAN, an SIB1 may be dedicatedly signaled while including the same preset parameter as that of the related art. In this case, the SIB1 may be transmitted while being included in a RRC connection reconfiguration message.

The SIB1 includes information on UE cell access, and defines scheduling of other SIBs. The SIB1 may include PLMN identifiers of the network, a TAC (Tracking Area Code), a cell ID, a cell barring status indicating whether a cell can camp on, a minimum reception level required in a cell used as a cell reselection reference, and information on transmission times and periods of other SIBs.

The SIB2 may include wireless common resource configuration information in all UEs. The SIB2 may include a uplink carrier frequency, a uplink channel bandwidth, RACH configuration, and information on paging configuration, uplink power control configuration, sounding Reference Signal configuration, and PUCCH configuration and PUSCH configuration to support ACK/NACK transmission.

The UE may apply an acquisition and change detection process of system information with respect to only a PCell. In the SCell, when a corresponding SCell is added, the E-UTRAN may provide all system information on the RRC connection state operation through dedicated signaling. When system information of the configured SCell is changed, the E-UTRAN may release a considered SCell and add the SCell afterward. This may be performed together with a single RRC connection reconfiguration message. The E-UTRAN may configure a broadcasted value in the considered SCell and other parameters through dedicated signaling.

The UE should ensure validity with respect to a specific type of system information. The above system information refers to required system information. The required system information may be defined as follows.

When the UE is in an RRC idle state: UE should ensure to include valid versions of MIB and SIB1 as well as SIB2 to SIB8, which may depend on support of the considered RAT.

When the UE is in an RRC connection state: UE should ensure to include valid versions of MIB, SIB1, and SIB2.

In general, validity of the system information may be ensured to a maximum three hours after acquisition.

Generally, services provided to the UE by the network may be divided into three types to be described below. Further, the UE differently recognizes the cell type according to which service may be provided. First, the services types will be described below, and then the cell types will be described.

1) Limited service: The service provides an emergency call and an earthquake and tsunami warning system (ETWS), and may be provided in an acceptable cell.

2) Normal service: The service means a public use of a general use, and may be provided in a suitable or normal cell.

3) Operator service: The service means a service for a communication network operator, and the cell may be used by only the communication network operator and may not be used by a general user.

In relation to the service type provided by the cell, the cell types may be divided below.

1) Acceptable cell: A cell in which the UE may receive the limited service. The cell is a cell which is not barred and satisfies a cell selection reference of the UE in the corresponding UE.

2) Suitable cell: A cell in which the UE may receive the normal service. The cell satisfies a condition of the acceptable cell and simultaneously satisfies additional conditions. As the additional conditions, the cell needs to belong to a public land mobile network (PLMN) to which the corresponding UE may be connected and be a cell in which the performance of the tracking area updating procedure of the UE is not barred. When the corresponding cell is a CSG cell, the UE needs to be a cell to be connected to the corresponding cell as the CSG member.

3) Barred cell: The cell is a cell which broadcasts information on a cell barred through the system information.

4) Reserved cell: The cell is a cell which broadcasts information on a cell reserved through the system information.

Figure 4:
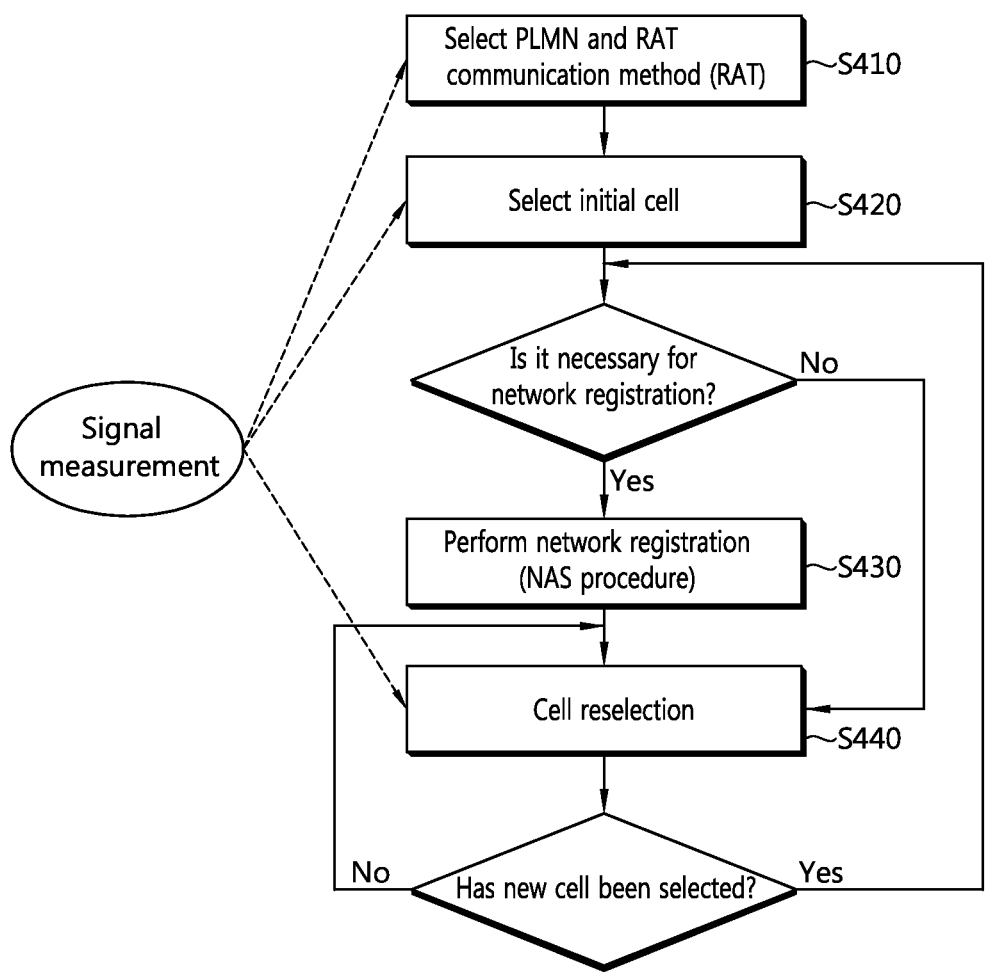
FIG. 4 is a flowchart illustrating an operation of the UE in the RRC idle state.

FIG. 4 is a flowchart illustrating an operation of the UE in the RRC idle state. FIG. 4 illustrates a procedure of registering a UE in which initial power is turned on in the network through a cell selection process and reselecting the cell if necessary.

Referring to FIG. 4, the UE selects a radio access technology (RAT) for communicating with the PLMN which is a network to receive the service (S410). Information on the PLMN and the RAT may be selected by the user of the UE, and stored in a universal subscriber identity module (USIM) to be used.

The UE selects the measuring BS and a cell having largest value among cells in which signal intensities and quality measured from the BS are larger than a predetermined value (Cell Selection) (S420). This is performing the cell selection by the turned-on UE and may be called initial cell selection. The cell selection procedure will be described below. After the cell selection, the UE receives system information which the BS periodically transmits. The aforementioned predetermined value means a value defined in the system for ensuring the quality for the physical signal in the data transmission/reception. Accordingly, the value may vary according to the applied RAT.

The UE performs a network registering procedure in the case where network registering is required (S430). The UE registers self-information (e.g., IMSI) in order to receive a service (e.g., paging) from the network. The UE needs not to be registered in the connected network whenever selecting the cell, but is registered in the network in the case where information (e.g., tracking area identity (TAI)) on the network received from the system information and information on a network which is known to the UE.

The UE performs cell reselection based on a service environment, a UE environment, or the like which is provide by the cell (S440). The UE selects one of other cells providing a better signal characteristic than the cell of the BS to which the UE is connected, when the value of the intensity or the quality of the signal measured from the BS receiving the service is a value measured from the BS of the neighbor cell. This process is distinguished from the initial cell selection of the second process to be called cell re-selection. In this case, in order to prevent the cell from being frequently reselected depending on the change in signal characteristic, there is a temporal constraint. The cell re-selection procedure will be described below.

Figure 5:
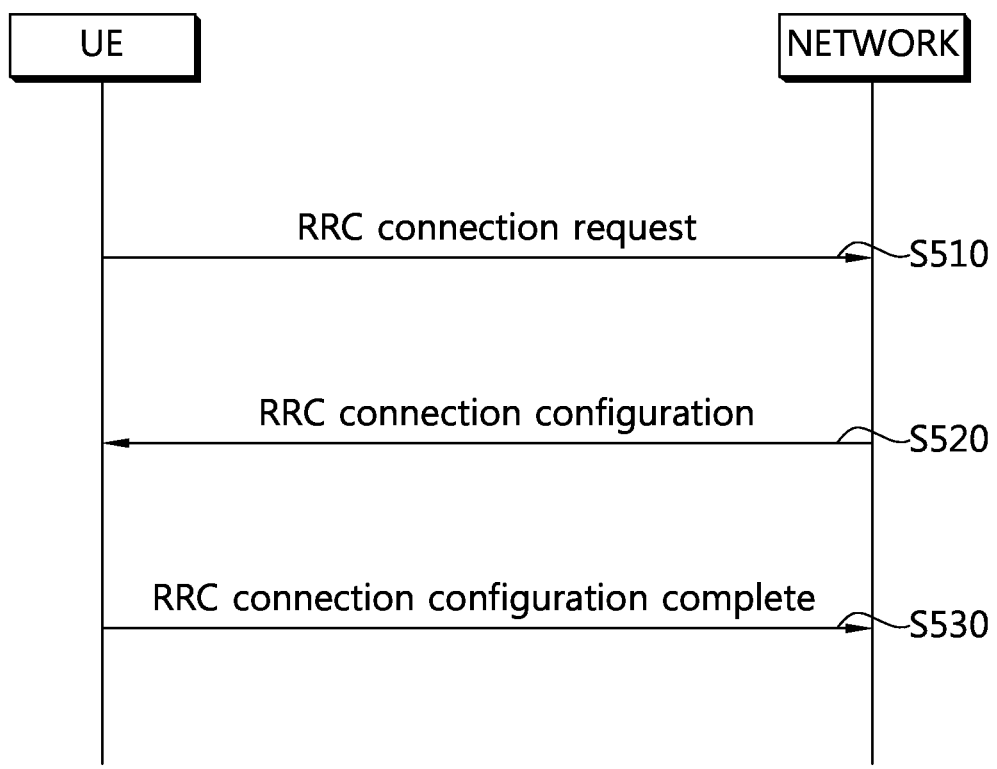
FIG. 5 is a flowchart illustrating a process of establishing RRC connection.

FIG. 5 is a flowchart illustrating a process of establishing RRC connection.

The UE transports an RRC connection request message requesting the RRC connection to the network (S510). The network transports an RRC connection setup message in a response for the RRC connection request (S520). After receiving the RRC connection setup message, the UE enters an RRC connection mode.

The UE transports to the network an RRC connection setup complete message used for verifying successful completion of the RRC connection establishment (S530).

Figure 6:
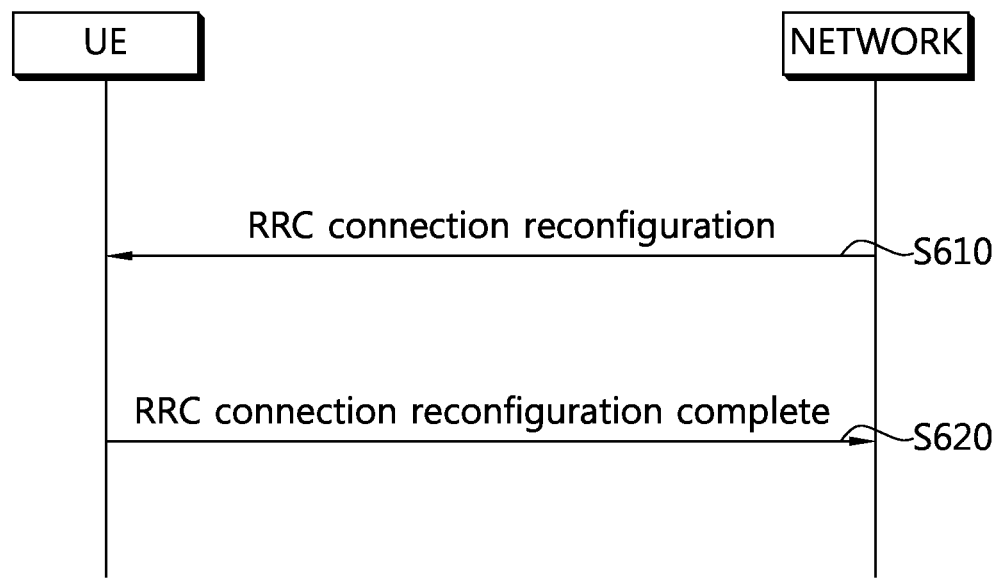
FIG. 6 is a flowchart illustrating an RRC connection reconfiguration process.

FIG. 6 is a flowchart illustrating an RRC connection reconfiguration process. The RRC connection reconfiguration is used for modifying the RRC connection. The RRC connection reconfiguration is used for RB establishment/modify/release, handover performance, and measurement setup/modify/release.

The network transports to the UE an RRC connection reconfiguration message for modifying the RRC connection (S610). The UE transports to the network an RRC connection reconfiguration complete message used for verifying successful completion of the RRC connection reconfiguration, as a response to the RRC connection reconfiguration (S620).

Hereinafter, the PLMN will be described.

The PLMN is a network which is arranged and operated by a mobile network operator. Each mobile network operator operates one or more PLMNs. Each PLMN may be identified as a mobile country code (MCC) and a mobile network code (MNC). PLMN information of the cell is included in the system information to be broadcasted.

In PLMN selection, cell selection, and cell re-selection, various types of PLMNs may be considered by the UE.

Home PLMN (HPLMN): PLMN having a MCC and a MNC matched with the MCC and the MNC of the UE IMSI.

Equivalent HPLMN (EHPLMN): PLMN handled to be equivalent to the HPLMN.

Registered PLMN (RPLMN): PLMN in which position registration is successfully completed.

Equivalent PLMN (EPLMN): PLMN handled to be equivalent to the RPLMN.

Each mobile service consumer is subscribed in the HPLMN. When a general service is provided to the UE by the HPLMN or the EHPLMN, the UE is not in a roaming state. On the other hand, when the service is provided to the UE by a PLMN other than the HPLMN/EHPLMN, the UE is in the roaming state, and the PLMN is called a visited PLMN (VPLMN).

The UE searches a usable PLMN and selects a suitable PLMN which may receive the service when the power is turned on in an initial stage. The PLMN is a network which is deployed or operated by a mobile network operator. Each mobile network operator operates one or more PLMNs. Each PLMN may be identified by a mobile country code (MCC) and a mobile network code (MNC). PLMN information of the cell is included in the system information to be broadcasted. The UE attempts to register the selected PLMN. When the registration is completed, the selected PLMN becomes a registered PLMN (RPLMN). The network may signal a PLMN list to the UE, and PLMNs included in the PLMN list may be considered as the PLMN such as the RPLMN. The UE registered in the network needs to be reachable by the network at all times. If the UE is in the ECM-CONNECTED state (equally, the RRC connection state), the network recognizes that the UE receives the service. However, when the UE is in the ECM-IDLE state (equally, the RRC idle state), the situation of the UE is not valid in the eNB, but stored in the MME. In this case, the position of the UE is in the ECM-IDLE state is notified to only the MME with granularity of the list of the tracking areas (TAs). A single TA is identified by a tracking area identity (TAI) constituted by a PLMN identity to which the TA belongs and a tracking area code (TAC) uniquely expressing the TA in the PLMN.

Next, among the cells provided by the selected PLMN, the UE selects a cell having signal quality and characteristic which may receive a suitable service.

Next, a procedure of selecting the cell by the UE will be described in detail.

When the power is turned on or the UE stays in the cell, the UE performs procedures for receiving the service by selecting/re-selecting a cell having proper quality.

The UE in the RRC idle state selects the cell having the proper quality at all times and needs to be prepared to receive the service through the selected cell. For example, the UE in which the power is just turned on needs to select the cell having the proper quality for registration to the network. When the UE in the RRC connection state enters the RRC idle state, the UE needs to select the cell staying in the RRC idle state. As such, a process of selecting the cell which satisfies any condition so that the UE stays in a service stand-by state such as the RRC idle state is called cell selection. Since the cell selection is performed in a state where the cell in which the UE stays in the RRC idle state is not currently determined, it is more important to select the cell as quickly as possible. Accordingly, so long as the cell is a cell providing radio signal quality of a predetermined level or more, even though the cell is not the cell providing the best signal quality to the UE, the cell may be selected in the cell selection process of the UE.

Hereinafter, with reference to 3GPP TS 36.304 V8.5.0 (2009-03) "User Equipment (UE) procedures in idle mode (Release 8)", a method and a procedure of selecting the cell by the UE in 3GPP LTE will be described in detail.

The cell selection process is largely divided to two processes.

First, as an initial cell selection process, the UE has no previous information on the radio channel in this process. Accordingly, the UE searches all radio channels in order to find a suitable cell. The UE finds the strongest cell in each channel. Thereafter, when the UE just finds the suitable cell stratifying a cell selection reference, the UE selects the corresponding cell.

Next, the UE may select the cell by using the stored information or using information broadcasted in the cell. Accordingly, the cell selection may be quickly performed as compared with the initial cell selection process. The UE selects the corresponding cell when just finding the cell satisfying the cell selection reference. If the UE does not find the suitable cell satisfying the cell selection reference through the process, the UE performs the initial cell selection process.

The cell selection reference may be defined by a following equation 1.

$$\text{Srxlev} > 0 \text{ AND } \text{Sqal} > 0 \qquad \text{[Equation 1]}$$

where:

$\text{Srxlev} = Q_{rxlevmeas} - (Q_{rxlevmin} + Q_{rxlevminoffset}) - \text{Pcompensation}$ $\text{Sqal} = Q_{qualmeas} - (Q_{qualmin} + Q_{qualminoffset})$ In this case, respective variables of the equation 1 may defined as listed in a following table 1.

TABLE 1

| | |
|---|---|
| Srxlev | Cell selection RX level value (dB) |
| Sqal | Cell selection quality value (dB) |
| $Q_{rxlevmeas}$ | Measured cell RX level value (RSRP) |
| $Q_{qualmeas}$ | Measured cell quality value (RSRQ) |

TABLE 1-continued

| | |
|---|---|
| $Q_{rxlevmin}$ | Minimum required RX level in the cell (dBm) |
| $Q_{qualmin}$ | Minimum required quality level in the cell (dB) |
| $Q_{rxlevminoffset}$ | Offset to the signalled $Q_{rxlevmin}$ taken into account in the Srxlev evaluation as a result of a periodic search for a higher priority PLMN while camped normally in a VPLMN [5] |
| $Q_{qualminoffset}$ | Offset to the signalled $Q_{qualmin}$ taken into account in the Squal evaluation as a result of a periodic search for a higher priority PLMN while camped normally in a VPLMN [5] |
| Pcompensation | $\max(P_{EMAX} - P_{PowerClass}, 0)$ (dB) |
| $P_{EMAX}$ | Maximum TX power level an UE may use when transmitting on the uplink in the cell (dBm) defined as $P_{EMAX}$ in [TS 36.101] |
| $P_{PowerClass}$ | Maximum RF output power of the UE (dBm) according to the UE power class as defined in [TS 36.101] |

Signaled values Qrxlevminoffset and Qqualminoffset may be applied when cell selection is evaluated as a result of a periodic search with respect to a PLMN having a higher priority while the UE camps on a normal cell in a VPLMN. In this way, during a period search with respect to a PLMN having a higher priority, the UE may evaluate cell selection using stored parameter values from another cell of the PLMN having a higher priority.

After the UE selects any cell through the cell selection process, the intensity or the quality of the signal between the UE and the BS may be changed according to mobility of the UE, a change in radio environment, or the like. Accordingly, when the quality of the selected cell deteriorates, the UE may select another cell providing better quality. As such, in the case of selecting the cell again, generally, the UE selects the cell providing better signal quality than the currently selected cell. This process is called cell reselection. The cell reselection process generally has a primary object to select a cell providing the best quality to the UE in terms of the quality of the radio signal.

In addition to the quality of the radio signal, the network determines a priority for each frequency to notify the determined priority to the UE. In the UE receiving the priority, the priority is first considered as compared the radio signal quality reference in the cell reselection process.

As such, there is the method of selecting or reselecting the cell according to a signal characteristic in the radio environment, and in the case of selecting the cell for reselection during the cell reselection, there may be methods of reselecting the cell according to a RAT of the cell and a frequency characteristic below.

Intra-frequency cell reselection: The UE reselects a cell having the same RAT and the same center-frequency as the cell during camping.

Inter-frequency cell reselection: The UE reselects a cell having the same RAT as and a different center-frequency from the cell during camping.

Inter-RAT cell reselection: The UE reselects a cell using a different RAT from the RAT during camping.

A principle of the cell reselection process is as follows.

First, the UE measures the quality of the serving cell and the quality of the neighbor cell for the cell reselection.

Second, the cell reselection is performed based on a cell reselection reference. The cell reselection reference has the following characteristics in association with the measurement of the serving cell and the neighbor cell.

The intra-frequency cell reselection is basically based on ranking. The ranking is an operation of defining index values for evaluating the cell reselection and ranking cells in an order of sizes of the index values by using the index values.

A cell having the best index value is commonly called a best ranked cell. The cell index value is based on a value measured by the UE with respect to the corresponding cell and is a value applying a frequency offset or a cell offset if necessary.

The inter-frequency cell reselection is based on a frequency priority provided by the network. The UE attempts to camp on in a frequency having the highest frequency priority. The network may provide a frequency priority to be commonly applied to the UEs in the cell through the broadcast signaling or provide a priority for each frequency for every UE through dedicated signal for each UE. The cell reselection priority provided through the broadcast signaling may be referred to as a common priority, and the cell reselection priority set by the network for each UE may be referred to as a dedicated priority. When the UE receives the dedicated priority, the UE may receive a validity time related with the dedicated priority together. When the UE receives the dedicated priority, the UE starts a validity timer set as the validity time received together. The UE applies the dedicated priority in the RRC idle mode while the validity timer operates. When the validity timer ends, the UE discards the dedicated priority and applies the common priority again.

For the inter-frequency cell reselection, the network may provide parameters (for example, a frequency-specific offset) used in the cell reselection to the UE for each frequency.

For the intra-frequency cell reselection or the inter-frequency cell reselection, the network may provide a neighbor cell list (NCL) used in the cell reselection to the UE. The NCL includes cell-specific parameters (for example, a cell-specific offset) used in the cell reselection.

For the intra-frequency cell reselection or the inter-frequency cell reselection, the network may provide a cell reselection black list used in the cell reselection to the UE. The UE does not perform the cell reselection with respect to the cell included in the black list.

Next, the ranking performed in the cell reselection evaluating process will be described.

A ranking criterion used to give the priority of the cell is defined by Equation 2.

$$R_S = Q_{meas,s} + Q_{hyst}, R_n = Q_{meas,n} - Q_{offset}$$ [Equation 2]

Here, $R_S$ represents a ranking criterion of the serving cell, $R_n$ represents a ranking criterion of the neighbor cell, $Q_{meas,s}$ represents a quality value measured with respect to the serving cell by the UE, $Q_{meas,n}$ represents a quality value measured with respect to the neighbor cell by the UE, $Q_{hyst}$ represents a hysteresis value for ranking, and $Q_{offset}$ represents an offset between the both cells.

In the intra-frequency, when the UE receives the offset $Q_{offsets,n}$ between the serving cell and the neighbor cell, $Q_{offset} = Q_{offsets,n}$, and when the UE does not receive $Q_{offsets,n}$, $Q_{offset} = 0$.

In the inter-frequency, when the UE receives the offset $Q_{offsets,n}$ for the corresponding cell, $Q_{offset} = Q_{offsets,n} + Q_{frequency}$, and when the UE does not receive $Q_{offsets,n}$, $Q_{offset} = Q_{frequency}$.

When the ranking criterion $R_S$ of the serving cell and the ranking criterion $R_n$ of the neighbor cell are changed in a similar state, the ranking order is frequently reversed as the changing result, and as a result, the UE may alternately reselect the two cells. $Q_{hyst}$ is a parameter for preventing the UE from alternately reselecting the two cells by giving the hysteresis in the cell reselection.

The UE measures the $R_S$ of the serving cell and the $R_n$ of the neighbor cell according to the Equation 1, regards the cell having the largest ranking criterion value as the best ranked cell, and selects the cell.

According to the reference, it can be seen that the quality of the cell acts as the most important reference in the cell reselection. When the reselected cell is not the suitable cell, the UE excludes the corresponding frequency or the corresponding cell from the cell reselection target.

In a case where the UE perform cell reselection according to cell reselection evaluation, when the cell reselection reference is satisfied for a specific time, the UE determines that the cell reselection reference is satisfied and moves to a selected target cell. In this case, the specific time is a Treselection parameter and may be given from the network. The Treselection specifies a cell reselection timer value, and may be defined with each frequency of the E-UTRAN and other RAT.

Hereinafter, cell reselection information used for cell reselection of the UE will be described.

The cell reselection information may be transmitted and provided to the UE while being included in system information broadcasted from a network in the form of a parameter. The cell reselection parameter provided to the UE may include following types.

A cell reselection priority (cellReselectionPriority): cellReselectionPriority parameter specifies a priority with respect to a group of frequencies of the E-UTRAN, frequencies of the UTRAN, a group of GERAN frequencies, a band class of CDMA2000 HRPD or a band class of CDMA2000 1xRTT.

$Q_{offset_{s,n}}$: specifies an offset value between two cells.

$Q_{offset_{frequency}}$: specifies a frequency specific offset with respect to an E-UTRAN frequency of the same priority.

$Q_{hyst}$: specifies a hysteresis value with respect to a rank index.

$Q_{qualmin}$: specifies a required minimum quality level in a dB unit.

$Q_{rxlevmin}$: specifies a required minimum Rx level in a dB unit.

$Treselection_{EUTRA}$: specifies a cell reselection timer value for the E-UTRAN, and may be configured with respect to each frequency of the E-UTRAN.

$Treselection_{UTRAN}$: specifies a cell reselection timer value for the UTRAN.

$Treselection_{GERA}$: specifies a cell reselection timer value for GERAN.

$Treselection_{CDMA\_HRPD}$: specifies a cell reselection timer value for CDMA HRPD.

$Treselection_{CDMA\_1xRTT}$: specifies a cell reselection timer value for CDMA 1xRTT.

$Thresh_{x,HighP}$: specifies a Srxlev threshold value in a dB unit used by the UE upon cell reselection to RAT/frequency having a priority higher than a serving frequency. A specific threshold value may be independently set with respect to each frequency of E-UTRAN and UTRAN, each group of GERAN frequencies, each band class of CDMA2000 HRPD, and each band class of CDMA2000 1xRTT.

$Thresh_{x,HighQ}$: specifies a Squal threshold value in a dB unit used by the UE upon cell reselection to RAT/frequency having a priority higher than a serving frequency. A specific threshold value may be independently set with respect to each frequency of E-UTRAN and UTRAN FDD.

$Thresh_{x,LowP}$: specifies a Srxlev threshold value in a dB unit used by the UE upon cell reselection to RAT/frequency having a priority lower than the serving frequency. A specific threshold value may be independently set with respect to each frequency of E-UTRAN and UTRAN, each group of GERAN frequencies, each band class of CDMA2000 HRPD and each band class of CDMA2000 1xRTT.

$Thresh_{x,LowQ}$: specifies a Squal threshold value in a dB unit used by the UE upon cell reselection to RAT/frequency having a priority lower than the serving frequency. A specific threshold value may be independently set with respect to each frequency of E-UTRAN and UTRAN FDD.

$Thresh_{Serving,LowP}$: specifies a Srxlev threshold value in a dB unit used by the UE upon cell reselection to a lower RAT/frequency.

$Thresh_{Serving,LowQ}$: specifies a Squal threshold value in a dB unit used by the UE upon cell reselection to a lower RAT/frequency.

$S_{IntraSerachP}$: specifies a Srxlev threshold value in a dB unit used by the UE upon cell reselection to a lower RAT/frequency.

$S_{IntraSerachQ}$: specifies a Squal threshold value in a dB unit with respect to intra-frequency measurement.

$S_{nonIntraSerachP}$: specifies a Srxlev threshold value in a dB unit with respect to E-UTRAN inter-frequency and inter-RAT measurements.

$S_{nonIntraSerachQ}$: specifies a Squal threshold value in a dB unit with respect to E-UTRAN inter-frequency and inter-RAT measurements.

Meanwhile, the above cell reselection parameter may be scaled according to mobility of the UE. The mobility of the UE may be estimated based on a moved number of times of the UE through cell reselection and/or handover during a specific time interval, which refers to a MSE (Mobility State Estimation). The mobility of the UE may be estimated to one of a normal mobility state), a medium mobility state, and a high mobility state according to the MSE.

In the MSE, a parameter to be used as a reference for estimating a mobility state of the UE may be provided. A $T_{CRmax}$ specifies a specific time interval for motion performing counting of another UE according to the MSE. A $N_{CR\_H}$ indicates a maximum cell reselection number of times for entering with high mobility. A $N_{CR\_M}$ indicates a maximum cell reselection number of times for entering with intermediate mobility. A $T_{CRmaxHyst}$ specifies an additional time interval before entering to a general mobility state.

If a cell reselection condition is satisfied, a UE in a RRC_IDLE state performs cell reselection. If the number of times by the UE performing cell reselection for $T_{CRmax}$ exceeds a first threshold value $N_{CR\_H}$, a mobility state of the UE satisfies a condition of a high mobility state. Meanwhile, if the number of times performing the cell reselection exceeds a second threshold value $N_{CR\_M}$ but does not exceeds the first threshold value $N_{CR\_H}$, the mobility state of the UE satisfies a condition of an intermediate mobility state. If the number of times performing the cell reselection by the UE does not exceed a second threshold value $N_{CR\_M}$, the mobility state of the UE satisfies a condition of the general mobility state. For example, if the UE is not in a high mobility state and a general mobility state for an additional time interval $T_{CRmaxHyst}$, the UE may be estimated in a general mobility state. However, when the UE continuously performs cell reselection between the same two cells, the number of times performing the cell reselection may not be counted.

A scale parameter may be specified according to a mobility state of the UE according to the MSE. The scaling parameter may be applied to at least one cell reselection parameter. A sf-Medium and a sf-High being a scaling parameter according to intermediate mobility and high mobility may be applied to Qhyst, $Treselection_{EUTRA}$, $Treselection_{UTRA}$, $Treselection_{GERA}$, $Treselection_{CDMA\_HRPD}$, and $Treselection_{CDMA\_1xRTT}$.

Hereinafter, radio link monitoring (RLM) will be described.

The UE monitors downlink quality based on a cell-specific reference signal in order to detect the downlink radio link quality of the PCell. The UE estimates the downlink radio link quality for monitoring the downlink radio link quality and compares the estimated quality with threshold values Qout and Qin. The threshold value Qout is defined as a level in which the downlink radio link may not be stably received, and corresponds to a block error rate of 10% of hypothetical PDCCH transmission by considering a PDFICH error. The threshold value Qin is defined a downlink radio link quality level which may be more stably received than the level of the Qout and corresponds to a block error rate of 2% of hypothetical PDCCH transmission by considering a PCFICH error.

Hereinafter, a radio link failure (RLF) will be described.

The UE continuously performs the measurement in order to maintain the quality of the radio link with the serving cell receiving the service. The UE determines whether the communication is impossible in the current situation due to deterioration of the quality of the radio link. When the communication is almost impossible due to the low quality of the serving cell, the UE determines the current situation as a radio link failure.

When the radio link failure is determined, the UE gives up the communication maintenance with the current serving cell, selects a new cell through the cell selection (or cell reselection) procedure, and attempts the RRC connection re-establishment to the new cell.

In a specification of 3GPP LTE, cases where the normal communication is impossible are exemplified below:
 a case where the UE determines that there is a serious problem in the downlink communication link quality based on the radio quality measuring result of the PHY layer (determines that the quality of the PCell is low during the RLM.
 a case where the UE determines that there is a problem in the uplink transmission when a random access procedure is continuously failed in a MAC sub-layer.
 a case where the UE determines that there is a problem in the uplink transmission when uplink data transmission is continuously failed in an RLC sub-layer.
 a case where the UE determines that the handover is failed.
 a case where a massage received by the UE does not pass through an integrity check.

Hereinafter, the RRC connection re-establishment procedure will be described in more detail.

Figure 7:
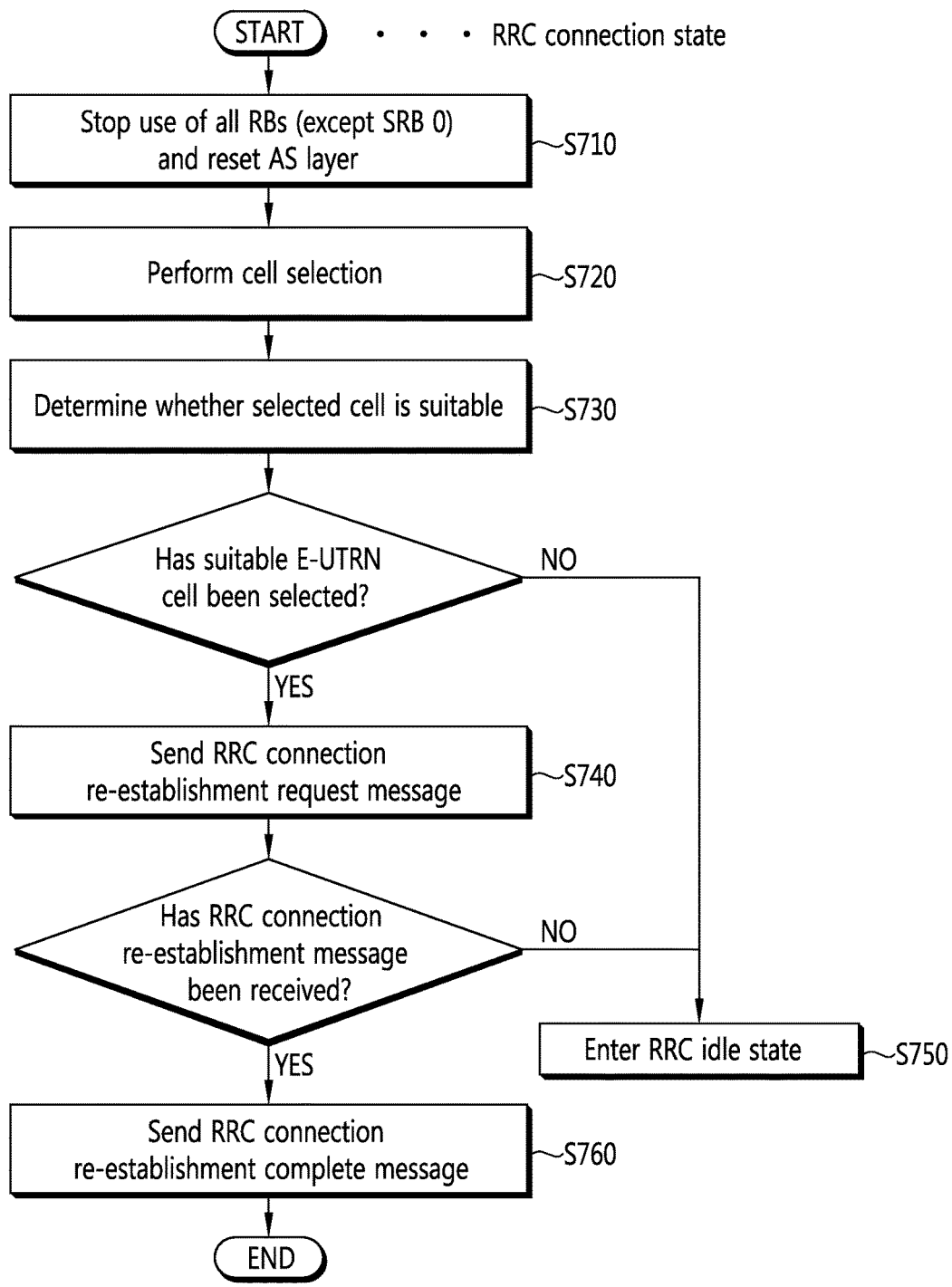
FIG. 7 is a diagram illustrating a RRC connection re-establishment procedure.

FIG. 7 is a diagram illustrating a RRC connection re-establishment procedure.

Referring to FIG. 7, the UE stops the used of all radio bearers which have been set except for signaling radio bearer #0 (SRB 0) and initializes each sub-layer of the AS (S710). Further, each sub-layer and the PHY layer are set as a default configuration. The UE maintains the RRC connection state during such a process.

The UE performs a cell selection procedure for performing the RRC connection reconfiguration procedure (S720). The cell selection procedure in the RRC connection reconfiguration procedure may be performed the same as the cell selection procedure performed in the RRC idle state of the UE even though the UE maintains the RRC connection state.

The UE verifies the system information of the corresponding cell to determine whether the corresponding cell is a suitable cell or not, after performing the cell selection procedure (S730). When it is determined that the selected cell is the suitable E-UTRAN cell, the UE transmits an RRC connection reestablishment request message to the corresponding cell (S740).

Meanwhile, when it is determined that the cell selected through the cell selection procedure for performing the RRC connection reestablishment procedure is the cell using the RAT other than the E-UTRAN, the UE stops the RRC connection reestablishment procedure and enters the RRC idle state (S750).

The UE may be implemented so that the cell selection procedure and the suitability verification of the cell by receiving the system information of the selected cell are finished within a limited time. To this end, the UE may drive a timer according to the starting of the RRC connection reestablishment procedure. The timer may stop when it is determined that the UE selects the suitable cell. When the timer ends, the UE may regard that the RRC connection reestablishment procedure is failed and enter the RRC idle state. The timer is hereinafter referred to as a radio link failure timer. In LTE specification TS 36.331, a timer called T311 may be used as the radio link failure timer. The UE may acquire the setting value of the timer from the system information of the serving cell.

In the case of receiving and accepting the RRC connection reestablishment request message from the UE, the cell transmits a RRC connection reestablishment message to the UE.

The UE receiving the RRC connection reestablishment message from the cell reconfigures the PDCP sub-layer and the RLC sub-layer for the SRB 1. Further, the UE calculates various key values related with security setting and reconfigures the PDCP sub-layer responsible for the security with newly calculated security key values. As a result, the SRB 1 between the UE and the cell is opened, and the RRC control message may be transmitted and received. The UE completes the restarting of the SRB 1, and transmits to the cell an RRC connection reestablishment complete message that the RRC connection reestablishment procedure is completed (S760).

On the contrary, in the case of receiving and rejecting the RRC connection reestablishment request message from the UE, the cell transmits a RRC connection reestablishment reject message to the UE.

When the RRC connection reestablishment procedure is successfully performed, the cell and the UE perform the RRC connection reestablishment procedure. As a result, the UE restores a state before performing the RRC connection reestablishment procedure and maximally secures continuity of the service.

Hereinafter, DRX (Discontinuous Reception) in a 3GPP LTE will be described.

A DRX is a scheme for reducing battery consumption of a UE by non-continuously monitoring a downlink channel.

Figure 8:
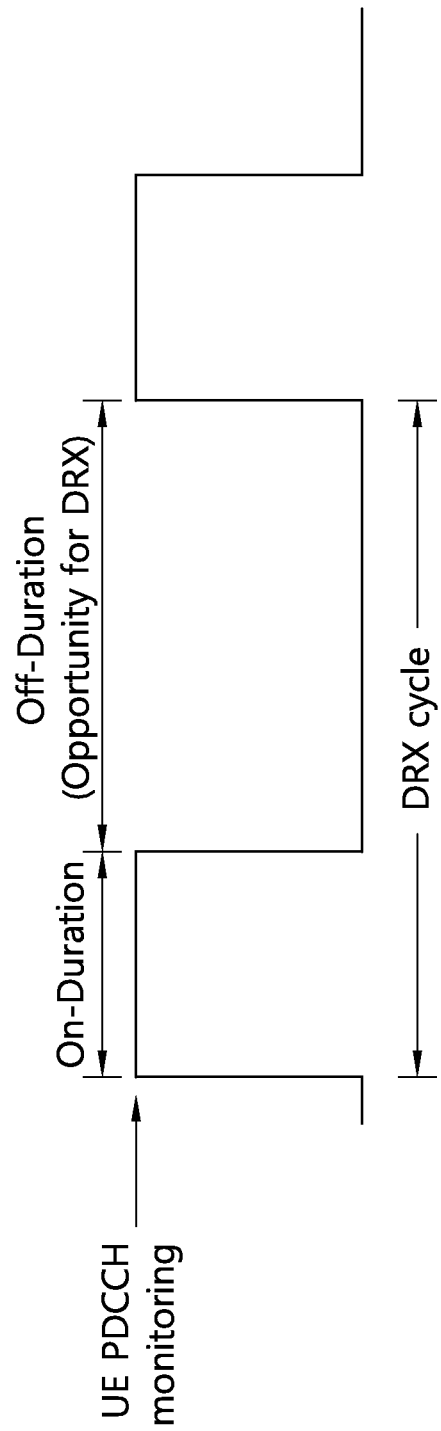
FIG. 8 illustrates a DRX cycle.

FIG. 8 illustrates a DRX cycle.

The DRX cycle specifies a periodic repetition of On-Duration where a possible interval of inactivity continues. The DRX cycle includes an On-interval and an Off-interval. The On-interval is an interval when the UE monitors the PDCCH un a DRX cycle.

If the DRX is set, the monitor monitors the PDCCH and may not monitor the PDCCH during an Off-interval.

An onDuration timer is used to define the On-interval. The On-interval may be defined as an interval when an onDuration timer is operated. The onDuration timer specifies the number of continuous PDCCH-sub-frames at a start time point of the DRX cycle. The PDCCH-sub-frame indicates a sub-frame in which the PDCCH is monitored.

In addition to the DRX cycle, an interval of monitoring the PDCCH may be further defined. The interval of monitoring the PDCCH is generally defined as an active time.

A drx-Inactivity timer inactivates a DRX. When the drx-Inactivity timer is operated, the UE continuously monitors the PDCCH regardless of the DRX cycle. If an initial UL grant or DL grant is received on the PDCCH, a drx-Inactivity timer starts. The drx-Inactivity may specify the number of continuous PDCCH-sub-frames after successfully decoding a PDCCH indicating initial UL or DL user data transmission for a corresponding UE.

An HARQ RTT timer defines a minimum interval when the UE waits for DL HARQ retransmission. The HARQ RTT timer may specify a minimum amount of a previous frame of the DL HARQ retransmission waited by the UE.

The drx-Retransmission timer defines an interval of monitoring the PDCCH while the UE waits for DL retransmission. The drx-Retransmission timer may specify a maximum number of continuous PDCCH-sub-frames after the UE waits for DL retransmission. After performing the initial DL transmission, the UE drives an HARQ RTT. If an error with respect to the initial DL transmission is found, the UE transmits NACK to a base station, stops a HARQ RTT timer, and drives a drx-Retransmission timer. While the drx-Retransmission timer is operated, the UE monitors a PDCCH for retransmitting a DL from the base station.

The active time may include an On-interval of periodically monitoring the PDCCH and an interval of monitoring the PDCCH due to generation of an event.

If the DRX cycle is configured, the active time may include following times:
  onDuration timer, drx-Inactivity timer, drx-Retransmission timer and/or a driving mac-ContentionResolution timer;
  Time when a scheduling request is transmitted on the PUCCH and pending time;
  Time when UL grant for retransmitting pending HARQ may be generated and there are data in a corresponding HARQ buffer;
  Time when a PDCCH indicating new transmission toward a C-RNTI is not received after a successful reception of a random access response for a preamble selected by the UE.

Figure 9:
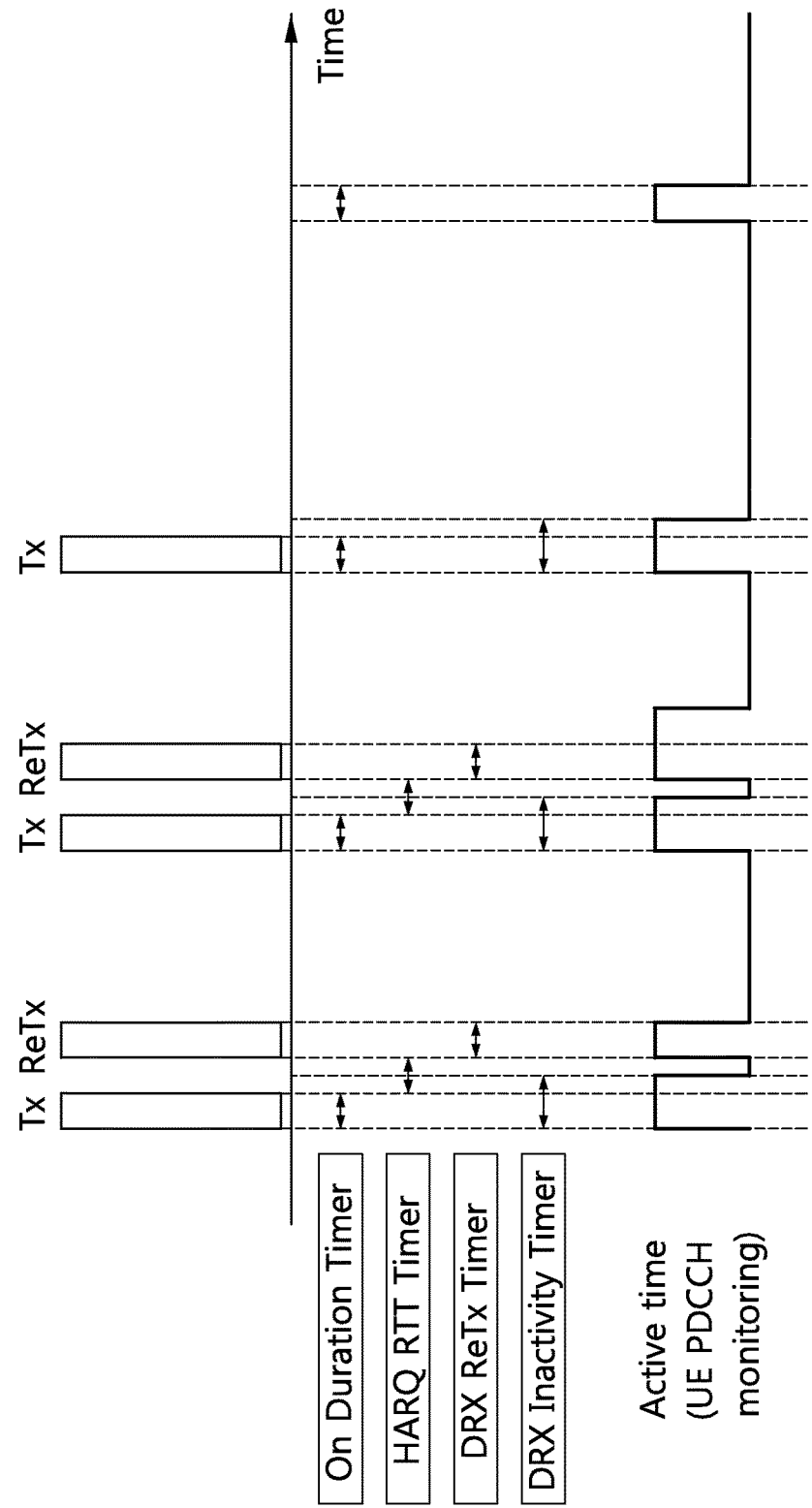
FIG. 9 illustrates an active time.

FIG. 9 illustrates an active time.

If the DRX is configured, the UE performs a following operation with respect to each frame:
  When the HATQ RTT timer is terminated at the sub-frame and data of a corresponding HARQ process is not successfully decoded:
  A drx-Retransmission timer for a corresponding HARQ process is operated.
  If a DRX Command MAC CE (control element) is received:
  onDuration timer and a drx-Inactivity timer stop.
  If the drx-Inactivity timer is terminated or a DRX Command MAC CE is received in the sub-frame:
  When a short DRX cycle is configured: a drx-ShortCycle timer starts or restarts and a short DRX cycle is used.
  Otherwise: a long DRX cycle is used.
  If a drx-ShortCycle timer is terminated:
  A long DRX cycle is used.

If a short DRX cycle is used and [(SFN*10)+subframe number] modulo (shortDRX-Cycle)=(drxStartOffset) modulo (shortDRX-Cycle) is satisfied; or A long DRX cycle is used and [(SFN*10)+subframe number] modulo (longDRX-Cycle)=drxStartOffset is satisfied:

A onDuration timer is operated.

During an active time, with respect to the PDCCH-subframe, the sub-frame is not required in UL transmission for operating a half-duplex FDD and the sub-frame is not a part of a configured measurement gap:

the UE monitors a PDCCH;

If the PDCCH indicates DL transmission or DL assignment with respect to the sub-frame is configured:

A HARQ RTT timer for a corresponding HARQ process is operated;

A drx-Retransmission timer for a corresponding HARQ process stops.

If the PDCCH indicates new (DL or UL) transmission:

The terminal operates or reoperates the drx-Inactivity timer.

The DRX cycle includes two types including a long DRX cycle and a short DRX cycle. The long DRX cycle of a long period may minimize battery consumption of the UE. The short DRX cycle of a short period may minimize data transmission delay.

Figure 10:
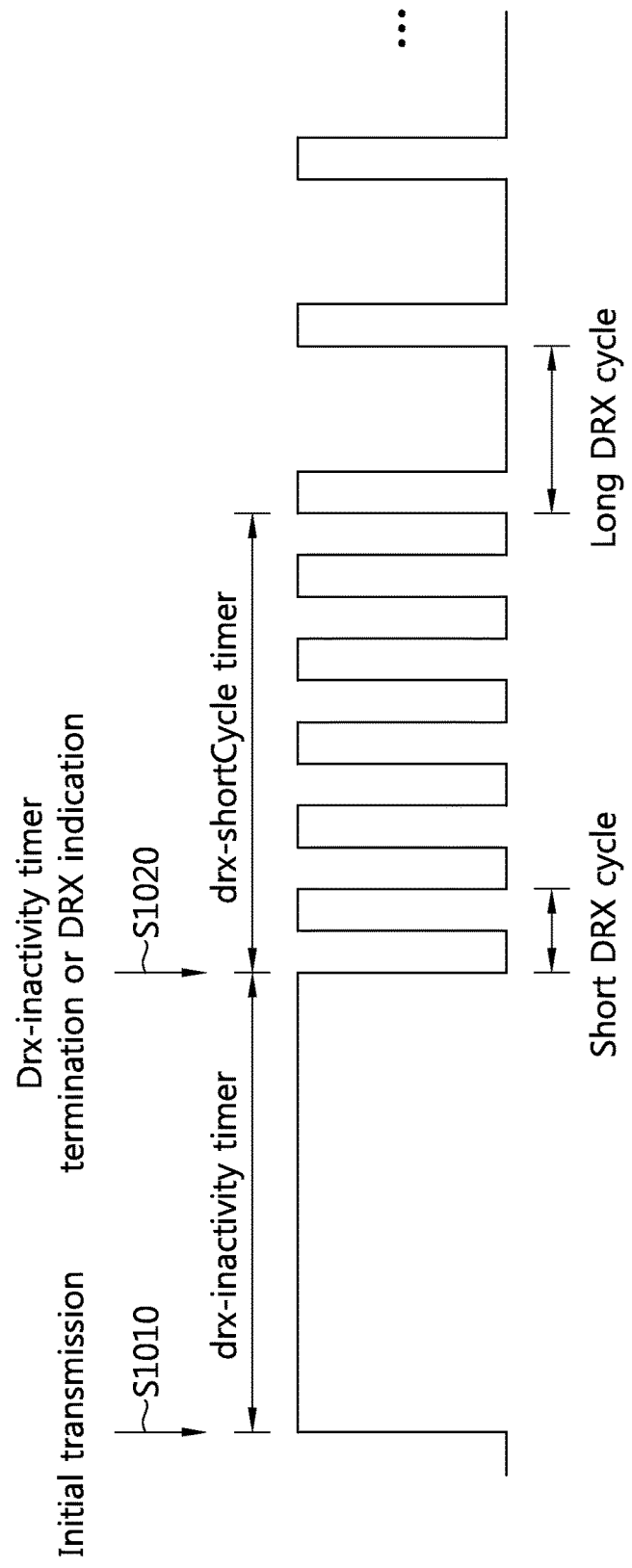
FIG. 10 illustrates an example of transition of the DRX cycle.

FIG. 10 illustrates an example of transition of the DRX cycle.

If initial transmission is received from a base station, a drx-Inactivity timer (may refer to a first timer or an inactivity timer) starts (S1010). When the drx-Inactivity timer is operated, the UE continuously monitors the PDCCH.

If the drx-Inactivity timer is terminated or a DRX command is received from the base station, the UE transitions to a short DRX cycle (S1120). Next, the drx-shortCycle timer (may refer to a second timer or a DRX cycle timer) starts.

The DRX command ᄂ MAC CE may be transmitted as a CE, which may refer to a DRX indicator indicating transitioning to the DRX. A DRX command MAC CE is identified through a LCID (Logical Channel ID) field of a MAC PDU subheader.

When the drx-shortCycle timer is operated, the UE operates at a short DRX cycle. If the drx-shortCycle timer is terminated, the UE transitions to a long DRX cycle.

If a short DRX cycle is previously configured, the UE transitions to a short DRX cycle. If the short DRX cycle is not previously configured, the UE may transition to a long DRX cycle.

A value of an HARQ RTT timer is fixed to 8 ms (or 8 sub-frames). Other timer values, that is, an onDuration timer, a drx-Inactivity timer, a drx-Retransmission timer or a mac-ContentionResolution timer may be configured by the base station through an RRC message. The base station may configure the DRX cycle and the short DRX cycle through an RRC message.

In the above process, the DRX Command MAC CE is an MAC CE use when an eNB commands the UE to be switched to a DRX state. As illustrated in the above process, if receiving a DRX Command MAC CE from the eNB, when a short DRX cycle is configured, the UE transitions to a short DRX state. When a short DRX cycle is not configured, the UE transitions to a long DRX state.

The DRX cycle and the short DRX cycle are illustrative purpose only, and an additional DRX cycle may be configured.

In the above process, the DRX Command MAC CE is an MAC CE use when an eNB commands the UE to be switched to a DRX state. As illustrated in the above process, if receiving a DRX Command MAC CE from the eNB, when a short DRX cycle is configured, the UE transitions to a short DRX state. When a short DRX cycle is not configured, the UE transitions to a long DRX state.

The DRX cycle and the short DRX cycle are illustrative purpose only, and an additional DRX cycle may be configured.

An operation of the UE may be controlled according to a frequency that communication with the network is performed or is required to be performed for data transmission/reception and/or control information signaling. Indication of a communication performing frequency of the UE may refer to activity of UE or an activation state of the UE. In order to control the operation of the UE according to the activity of the UE or the activation state of the UE, the network may provide configuration information to the UE.

For example, when active connection between the UE and the network for data transmission is frequently required, the network may cause the UE to continuously maintain the RRC connection state. Accordingly, RRC connection establishment process relation signaling generated when the UE is not in a RRC connection establishment state may be avoided.

In contrast, when active connection between the UE and the network for data transmission is rarely required or is not required, the network may cause the UE to continuously maintain an RRC idle state. Accordingly, when the UE is moved, handover relations signaling for maintaining the RRC connection state may be avoided.

In this way, the network generates configuration information by taking into consideration the activity and/or the activation state of the UE. In order to provide the configuration information to the UE, there may be a need to provide information on UE state to the network. Hereinafter, a method of reporting information on UE state in a wireless communication system will be described.

Figure 11:
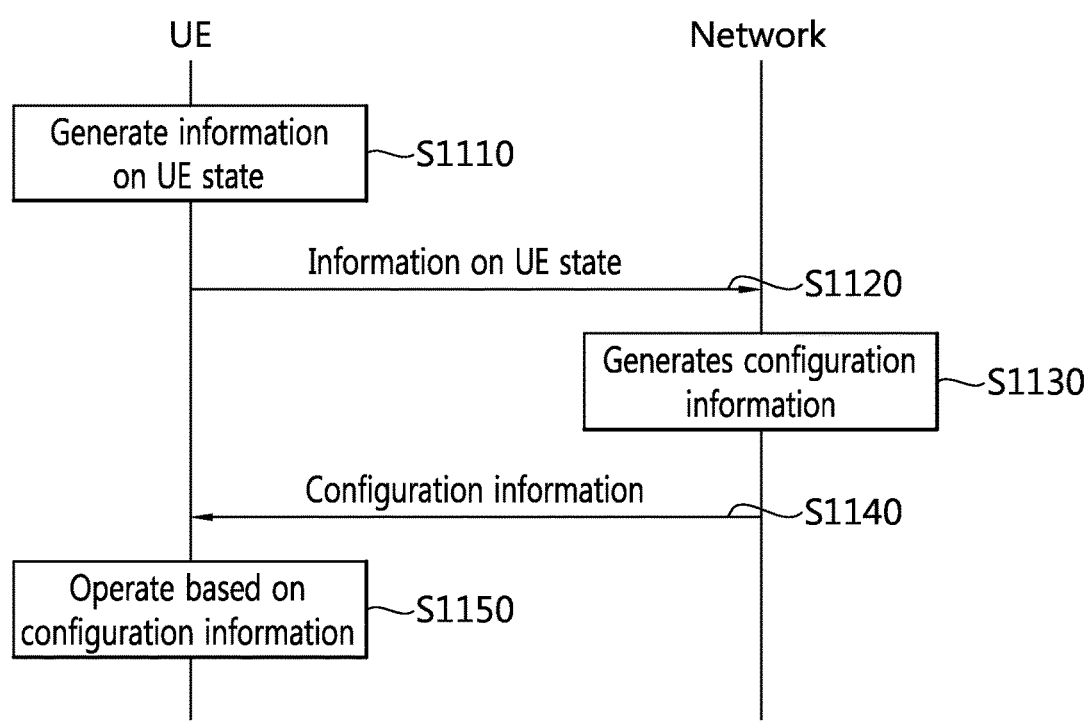
FIG. 11 is a flowchart illustrating a method of reporting information on UE state according to an embodiment of the present invention.

FIG. 11 is a flowchart illustrating a method of reporting information on UE state according to an embodiment of the present invention.

Referring to FIG. 11, the UE generates information on UE state (S1110).

The information on the UE state may include activation information on UE state. The activation information on UE state may be implemented as information on the activity of the UE and/or an activation state of the UE.

The UE may determine the activity of the UE. The activity of the UE may be determined/estimated through the number of times of RRC state transitions, a continuation time when the UE is in a an RRC idle state, a rate of activation sub-frame, a traffic type and/or pattern, and recent data transmission and reception time point. Hereafter, contents to be considered as activity of the UE will be described.

1. The Number of Times of RRC State Transitions

The activity of the UE may be determined as the number of times when the UE transitions the RRC state during specific N sub-frames. The number of times of the RRC state transitions may be depend on the number of times of transitions of the UE from the RRC connection state to the RRC idle state and/or the number of times of transitions of the UE from the RRC idle state to the RRC connection state.

2. RCC Idle State/RRC Connection State Continuation Time of UE

The activity of the UE may be determined as a continuation time when the UE maintains in the RRC idle state. In detail, the RRC idle state continuation time may be a continuation time when the UE maintains in a RRC idle state just before entering a current RRC connection state. Alternatively, the RRC idle state continuation time may be an average RRC idle state with respect to RRC idle state operation N times currently performed by the UE. The N may be a preset value or a specific value set by the network.

The activity of the UE may be determined as a continuation time when the UE maintains in a RRC connection state. In detail, the activity of the UE may be determined as a continuation time regarding how long the UE maintains in the current RRC connection state. Alternatively, the activity of the UE may be an average RRC connection state continuation time with respect to RRC connection state N times currently performed by the UE. In this case, N may be a preset value or a specific value set by the network.

3. The Number/Rate of Active Sub-Frames

The activity of the UE may be determined as the number of active sub-framed and a rate of active sub-frames with respect to the number of N recent sub-frames.

The active sub-frame may include a sub-frame scheduled in order to transmit/receive data through a channel such as the PUSCH or the PDSCH in the RRC connection state. That is, active sub-frame may include a specific frame among sub-frames for an RRC connection state continuation time of the UE.

The number of N recent sub-frames may be the number of span sub-frames span in at least one RRC connection state. In detail, the N recent sub-frames may be specified as N latest sub-frames even if the UE in some states including the RRC connection state and the RRC idle state. Alternatively, the N recent sub-frames may be specified as N recent sub-frames when the UE is in the RRC connection state. In this case, when the UE is in the RRC idle state, sub-frames may be excluded from the N recent sub-frames.

4. Traffic Type/Traffic Pattern

The activity of the UE may be determined as characteristics of a traffic generated from an upper layer such as an NAS layer or an application layer and/or characteristics of a traffic triggering current RRC connection establishment. For example, the activity of the UE may be determined as whether an active traffic is a delay sensitive traffic.

The delay sensitive traffic may be as follows.

Traffic of a delay budget lower than a specific threshold value (e.g. maximum delay)

Traffic of maximum delay variance lower than a specific threshold value

Traffic included in voice/image chatting service

Traffic included in real time gaming

Traffic included in "real time" media transmission or data mirroring service (data generated in one device is generated by another device in real time)

5. The Latest Time Point when Transmission/Reception of Data Traffic is Achieved The activity of the UE may be determined as the latest time point when transmission/reception of data traffic for the UE is achieved. The achieved time point indicates an absolute time point when transmission and/or reception of the data traffic is achieved. This may be coded as date/hour/second. Alternatively, the achieved time point may be specified/coded at a relative time point indicating a lapse time from the time point when the UE generates or transmits information on UE state.

The activation state of the UE may be quantized according to the above activity of the UE. Hereinafter, the activation state of the UE according to the activity of the UE will be described.

1. When the Activity of the UE is Specified to the Number of Times of RRC State Transitions If the number of times of RRC state transitions is greater than a specific threshold value as the activity of the UE, it may be determined that the activation state of the UE is a high activation state. If the number of times of RRC state transitions is less than a specific threshold value as the activity of the UE, it may be determined that the activation state of the UE is a low activation state. For example, when the threshold value is previously set to N or is set by the network, if the number of times of RRC state transitions is N+1, it may be determined that the activation state of the UE is a high activation state. If the number of times of RRC state transitions is N−1, it may be determined that the activation state of the UE is a high activation state. If the number of times of RRC state transitions is the same as a threshold value, the activation state may be classified into a high activation state or a low activation state.

In the present embodiment, the activation state of the UE is classified into a high activation state and a low activation state according to the number of times of RRC state transitions, but the present invention is not limited thereto. When a plurality of threshold values are provided, an activation state of the UE may be classified into various states. For example, when the threshold value is a first threshold value or a second threshold value, the activation state of the UE may be classified into a high activation state, a normal activation state, and a low activation state.

2. When the Activity of the UE is Specified as RRC Idle/Connection State Continuation Time When the activity of the UE is specified as a continuation time in an RRC idle state before the UE enters an RRC connection state, if the RRC idle state continuation time is less than a specific threshold value, it may be determined that the activation state of the high activation state. If the RRC idle state continuation time is greater than a specific threshold value, it may be determined that the activation state of the low activation state.

When the activity of the UE is an average RRC idle state continuation time with respect to N recent RRC idle states, if the average RRC idle state continuation time is less than the specific threshold value, it may be determined that the activation state of the UE is the high activation state. If the average RRC idle state continuation time is greater than the specific threshold value, it may be determined that the activation state of the UE is the low activation state.

When the activity of the UE is specified as a current RRC connection state continuation time, if the current RRC connection state continuation time is greater than the specific threshold value, it may be determined that the activation state of the UE is the high activation state. If the current RRC connection state continuation time is less than the specific threshold value, it may be determined that the activation state of the UE is the low activation state.

When the activity of the UE is specified as an average RRC connection state continuation time with respect to N recent RRC connection states, if the average RRC connection state continuation time is greater than the specific threshold value, it may be determined that the activation state of the UE is the high activation state. If the average RRC connection state continuation time is less than the specific threshold value, it may be determined that the activation state of the UE is the low activation state.

In the present embodiment, the activation state of the UE is classified into two types including a high activation state and a low activation state according to the RRC idle/connection state continuation time or the average RRC idle/connection state continuation time, but the present invention is not limited thereto. When a plurality of threshold values are provided, the activation state of the UE may be classified into various states. For example, the threshold value includes a first threshold value and a second threshold value, the activation state of the UE may be classified into a high activation state, a normal activation state, and a low activation state.

3. When the Activity of the UE is Specified as the Number/Rate of the Active Sub-Frames When the activity of the UE is specified as the number/a rate of the active sub-frames, if the number or a rate of the active sub-frames is greater than the specific threshold value, it may be determined that the activation state of the UE is a high activation state. If the number or a rate of the active sub-frames is less than the specific threshold value, it may be determined that the activation state of the UE is a low activation state.

For example, when a number relation threshold value is previously set to K or is set by the network, if the number of active sub-frames is K+1, it may be determined that the activity state of the UE is a high activation state. If the number of times of state transitions is K−1, it may be determined that the activity state of the UE is a low activation state. When the number of active sub-frames is the same as the threshold value, the activity state of the UE may be classified into the high activation state or the low activation state according to the implementation.

As another example, when a rate relation threshold value is previously set to P or is set by the network, if a rate of the active sub-frames is greater than P, it may be determined that the activity state of the UE is the high activation state. If a rate of the active sub-frames is greater than P, it may be determined that the activity state of the UE is the high activation state.

In the present embodiment, the activation state of the UE is classified into a high activation state and a low activation state according to the number/rate of active sub-frames, but the present invention is not limited thereto. When a plurality of threshold values are provided, an activation state of the UE may be classified into various states. For example, when the threshold value is a first threshold value or a second threshold value, the activation state of the UE may be classified into a high activation state, a normal activation state, and a low activation state.

4. When Activity of the UE is Specified According to Traffic Type/Traffic Pattern If RRC connection establishment is triggered according to a delay sensitive traffic generated from an NAS layer, the activation state of the UE may be determined as the high activation state. In contrast, if the RRC connection establishment is triggered according to a non-delay sensitive traffic generated from an NAS layer, the activation state of the UE may be determined as a non-high activation state.

If there is a service to generate delay sensitive traffic from the NAS or an application, the activation state of the UE may be determined as the high activation state. Conversely, if there is no service to generate delay sensitive traffic from the NAS or an application, the activation state of the UE may be determined as the low activation state or the non-high activation state.

When a specific type of at least one of a session or the application to the delay sensitive traffic is activated from an upper layer (e.g. NAS layer, application layer), the activation state of the UE may be determined as the high activation state. Otherwise, the activation state of the UE may be determined as the low activation state. If the session/application is operated, it may be considered that the session/application is activated. Alternatively, if the session/application is generating traffic, it may be considered that the session/application is activated. Alternatively, when the session/application is operated in a non-background mode, it may be considered that the session/application is activated.

When RRC connection is established in order to transfer a NAS message not to start user data exchange, the activation state of the UE may be determined as the low activation state or a non-user data exchange state. Otherwise, the activation state of the UE may be determined as the high activation state or the user data exchange state. An NAS message for starting user data transmission may include a service request or an extended service request. The NAS message not to start the user data transmission may include a tracking Area update request.

5. When the Activity of the UE is Specified as a Data Traffic Transmission/Reception Generation Time Point When a latest data traffic transmission/reception performing time point is after a threshold time point, the activity state of the UE may be determined as the high activation state. In contrast, when the latest data traffic transmission/reception performing time point is before a specific time point, the activity state of the UE may be determined as the low activation state.

For example, when the latest data traffic transmission/reception time point is defined as an absolute time point, the activation state of the UE may be determined by comparing a threshold time point with an absolute time point. The threshold time point may be determined as the specific time point. When the absolute time point is before the threshold time point, the activation state of the UE may be determined as the low activation state. When the absolute time point is after the threshold time point, the activation state of the UE may be determined as the high activation state.

As another example, when the latest data traffic transmission/reception time point is defined as an absolute time based on a UE state information generation time point or a UE state information report time point, the activation state of the UE may be determined by comparing a threshold time point with an absolute time point. The threshold time may be defined as a time interval from the UE state information generation time point or the UE state information report time point to the specific time point. If the absolute time is longer than the threshold time, the activity state of the UE may be determined as the low activation state. If the absolute time is shorter than the threshold time, the activity state of the UE may be determined as the high activation state.

In the above, the activation state of the UE is classified according to the activity of the UE and is determined as a specific state by way of example. However, the activity of the UE itself may be used to indicate the activation state of the UE. In this case, the activity may be classified whether an activation state is higher or lower than a specific value.

Activity information on UE state may include activity of UE and/or an activity state of UE. In order to create the activity information on UE state including the activity of the UE and the activity state of the UE, the UE may determine the activity of the UE and may determine the activity state of the UE according to the determined activity. When the activity information on UE state including the activity of the UE is generated and reported to the network, the activity state of the UE may be determined by the network if necessary.

The activity information on UE state may include information indicating whether the UE includes running delay sensitive session/application in an upper layer such as an NAS layer and an application layer.

The activity information on UE state may include information indicating whether the UE is in a high activity state or a low activity state.

The activity information on UE state may include mobility information on UE state as well as the above activity information on UE state. The mobility state information may indicate a mobility state of UE estimated through an MSE.

Referring back to FIG. 11, the UE may transmit information on UE state (S1120).

The UE may transmit the information on UE state to the network as a response to a report request from the network. The UE may generate information on UE state and report that there is information on UE state to be reported. To this end, the UE may transmit an UE state information usable indicator to the network. If the network receives the UE state information usable indicator, the network transmits a UE state information report request. The UE may transmit the information on UE state to the network as a response to the UE state report request.

The UE may transmit information on UE state to the network without a request from the network. The UE may transmit the information on UE state to the network during RRC connection establishment or after termination of the RRC connection establishment. The information on UE state may be transmitted while being included in an RRC connection configuration termination message transmitted when the RRC connection establishment process is terminated. The information on UE state may be transmitted while being included in a handover termination message transmitted when a handover process is terminated.

When the UE reports the information on UE state, the UE may determine whether to transmit the information on UE state to the network or whether to transmit the UE state information usable indicator to the network in order to report that there is the information on UE state to be reported to the network. To this end, a UE state information report condition may be defined. When the UE state information report condition is satisfied, the UE may determine to transmit the information on UE state and/or the UE state information usable indicator. The UE state information report condition may be defined as follows.

When mobility of the UE is higher than specific threshold mobility

When the UE is in a high mobility state

When the UE is not in a low mobility state

When the activity state of the UE is lower than a specific threshold activation state When the activity state of the UE is a low activity state When the activity state of the UE is not a high activity state When the mobility of the UE is higher than specific threshold mobility and the activity state of the UE is lower than a specific threshold activity state When the UE is in a low mobility state and the activity state of the UE is a low activity state When the UE is in not a low mobility state and the activity state of the UE is a high activity state Various types of UE state information report conditions may be applied by combining at least one condition with each other. When the at least one condition is satisfied, the UE may determine to transmit UE state information and/or UE state information usable indicator.

If the network acquires the information on UE state from the UE, the network generates configuration information to be provided to the UE (S1130). The configuration information may be generated based on the information on UE state from the UE. The network confirms the activity of the UE and/or the activity state of the UE through activity information on UE state of the information on UE state. The network may generate configuration information for controlling an operation of the UE by taking into consideration the confirmed activity of the UE and/or activity state of the UE.

The configuration information may include information on a mobility policy of the UE or information on a wireless resource assigned to the UE. The information on a mobility policy of the UE may include a configuration parameter to control movement of the UE or performing a process associated with the RRC state of the UE. The information on a wireless resource assigned to the UE may include a configuration parameter for controlling wireless resource scheduling with respect to the UE.

For example, the network may configure a parameter and add the configured parameter to the configuration information according to the activity and/or the activity state of the UE so that the UE maintains the RRC connection state long or is in the RRC idle state long. In more detail, if the network determines that the number of RRC connection state entering of the UE is great, the network may configure the parameter and add the parameter to the configuration information so that the RRC connection state of the UE may maintain long. In this case, the UE may be operated at the RRC connection state for a long continuation time as compared with the related art. Signaling necessary to enter the RRC connection state due to transition of the RRC connection state may be reduced.

As another example, the network may configure a parameter and add the parameter to the configuration information that allows the UE to frequently monitor a control channel to thereby frequently acquire scheduling information or to reduce a control channel monitoring frequency to thereby avoid acquisition of the scheduling information according to the activity and/or the activity state of UE. In detail, if the network determines that the number of activation sub-frames at the RRC connection state of the UE is greater than the number of sub-frames necessary for transmission/reception of data with respect to a real UE, the network may configure a shorter DRX parameter and add the shorter DRX parameter to the configuration information. In this case, unnecessary signaling with respect to the UE may be reduced, and data transmission/reception quality of the UE may be improved.

The network transmits the configuration information to the UE (S1140). The configuration information may be transmitted while being included in the RRC reset message to be transmitted to the UE from the network. Alternatively, the configuration information may be transmitted while being included in a RRC message newly defined for signaling of the configuration information.

The UE is operated based on the configuration information acquired from the network (S1150).

The UE may establish RRC connection based on information on control of RRC state transition included in the configuration information, and may transition the RRC state.

The UE may move through cell reselection/handover included in the configuration information based on a parameter associated with the cell reselection/handover. The UE may communicate with the network such data transmission/reception based on the parameter associated with wireless resource assignment included in the configuration information.

The UE may acquire wireless resource scheduling information by monitoring the PDCCH based on the DRX parameter configured by the network, and may exchange data with the network through the scheduled wireless resource.

Figure 12:
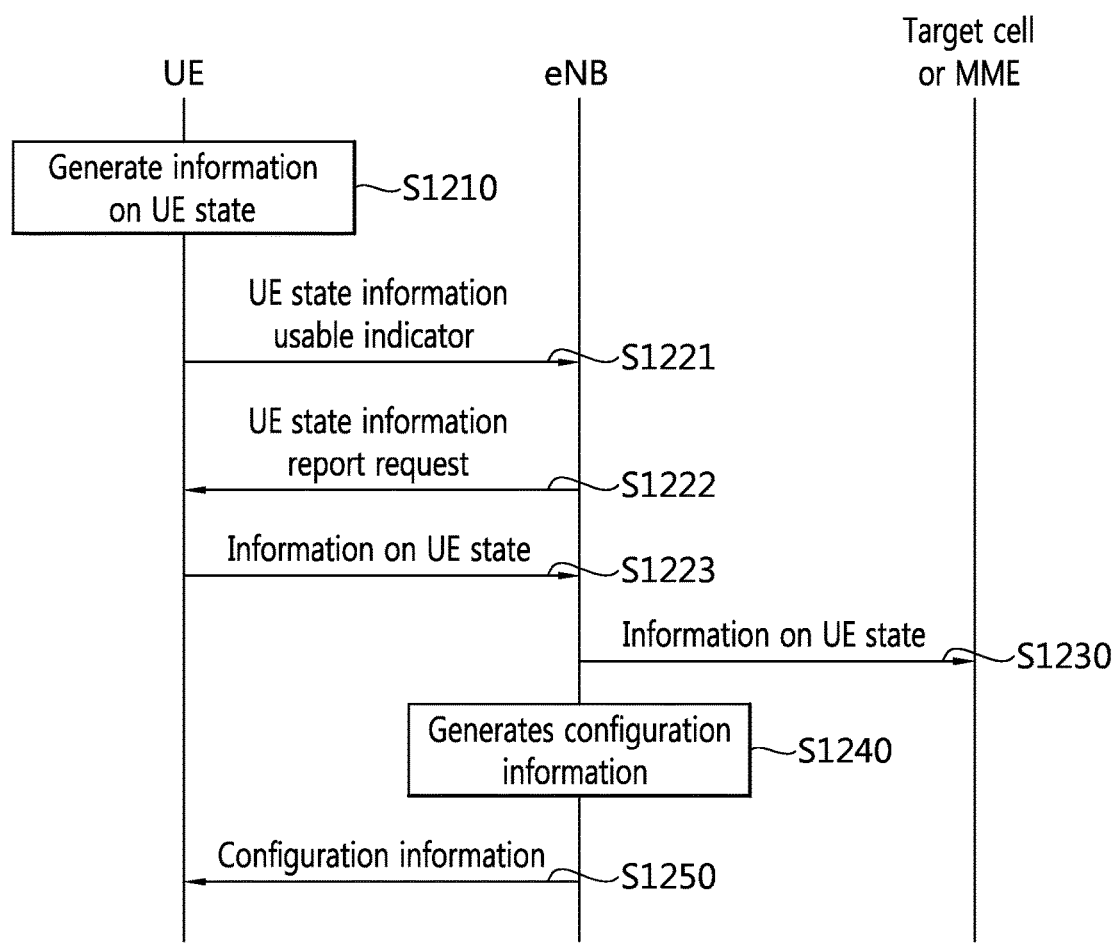
FIG. 12 is a diagram illustrating an example of a method for reporting information on UE state according to an embodiment of the present invention.

FIG. 12 is a diagram illustrating an example of a method for reporting information on UE state according to an embodiment of the present invention.

Referring to FIG. 12, the UE generates information on UE state (S1210). The generation of the information on UE state by the UE may include determining/estimating the activity of the UE and determining the activity state of UE according to the activity of the UE. The information on UE state may be implemented as illustrated in FIG. 11.

The UE may report the information on UE state according to a UE state information report request. To this end, the UE may transmit the UE state information usable indicator indicating that there is the information on UE state to the base station (S1221).

The serving base station may know that the UE include the information on UE state to be reported by acquiring the UE state information usable indicator. Accordingly, the serving base station may transmit a UE state information report request requesting to report the information on UE state to the UE (S1222).

The UE may transmit the information on UE state to the serving base station as a response to the UE state information report request from the network (S1223).

The serving base station may forward the acquired information on UE state to another network entity (S1230). For example, the UE may transfer the information on UE state to a target cell or an MME during the handover (e.g. handover preparation process). Alternatively, the UE may transfer the information on UE state to the MME through general signaling. The MME may transfer the information on UE state to another network entity (e.g. another base station).

The serving base station generates configuration information based on the information on UE state (S1240), and transmits the configuration information to the UE (S1250). The configuration information may be implemented as in the above configuration information illustrated with reference to FIG. 11.

The UE may perform an operation based on the configuration information acquired from the serving base station.

Figure 13:
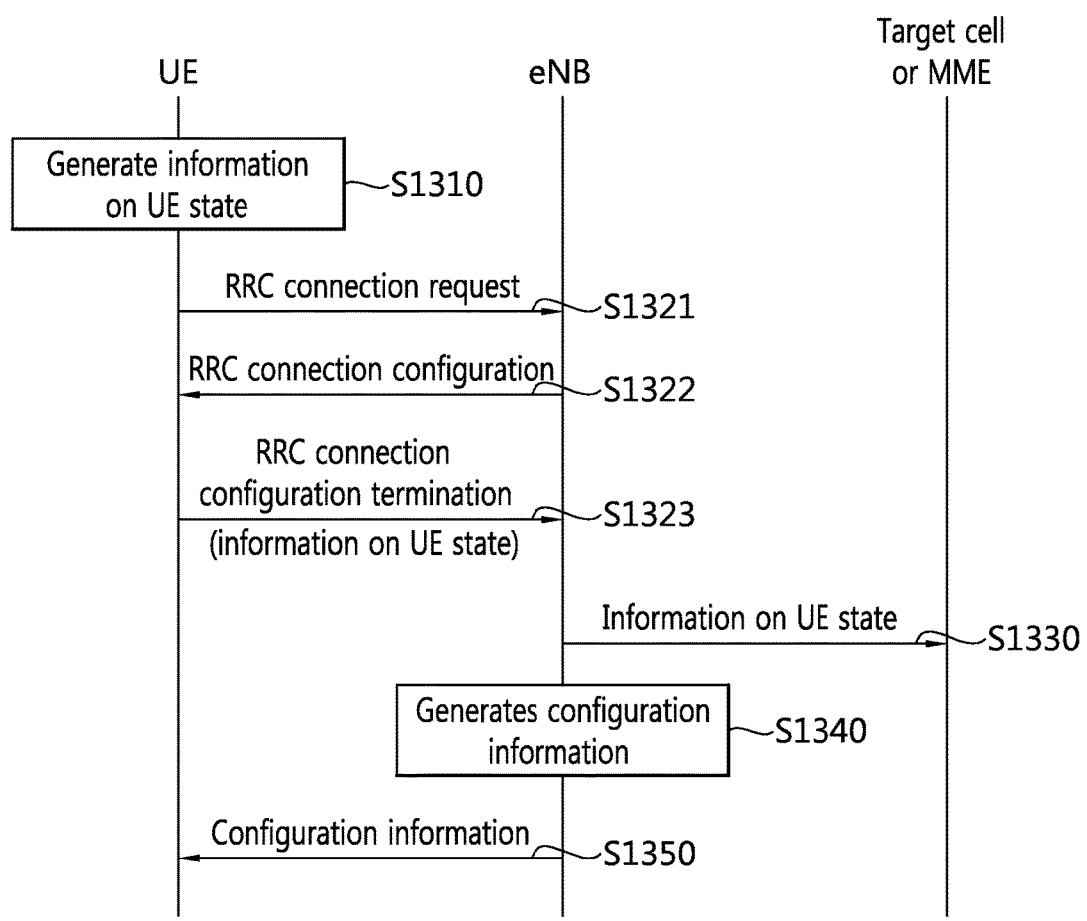
FIG. 13 is a diagram illustrating another example of the method of reporting information on UE state according to an embodiment of the present invention.

FIG. 13 is a diagram illustrating another example of the method of reporting information on UE state according to an embodiment of the present invention.

Referring to FIG. 13, the UE generates information on UE state (S1310). The generation of the information on UE state by the UE may include determining/estimating the activity of the UE and determining the activity state of UE according to the activity of the UE. The information on UE state may be implemented as illustrated in FIG. 11.

The UE may report the information on UE state during an RRC connection establishment process performed between the UE and the base station. The UE transmits the RRC connection request message to the serving base station (S1321). If the RRC connection establishment is allowed, the serving base station transmits the RRC connection configuration message to the UE (S1322). The UE receives the RRC connection configuration message and transmits an RRC connection configuration termination message to the serving base station when the RRC connection establishment process is terminated, and may transmit the information on UE state to the RRC connection configuration message to transmit the RRC connection configuration message to the serving base station (S1323).

The serving base station may forward the acquired information on UE state to another network entity (S1330). For example, the UE may transfer the information on UE state to a target cell or an MME during a handover process (e.g. handover preparation process). Alternatively, the UE may transfer the information on UE state to the MME through general signaling. Further, the MME may transfer the information on UE state to another network entity (e.g. another base station).

The serving base station generates configuration information based on the information on UE state (S1340), and transmits the generated configuration information to the UE (S1350). The configuration information of UE may be implemented as illustrated in FIG. 11.

The UE may perform an operation based on the configuration information acquired from the serving base station.

Figure 14:
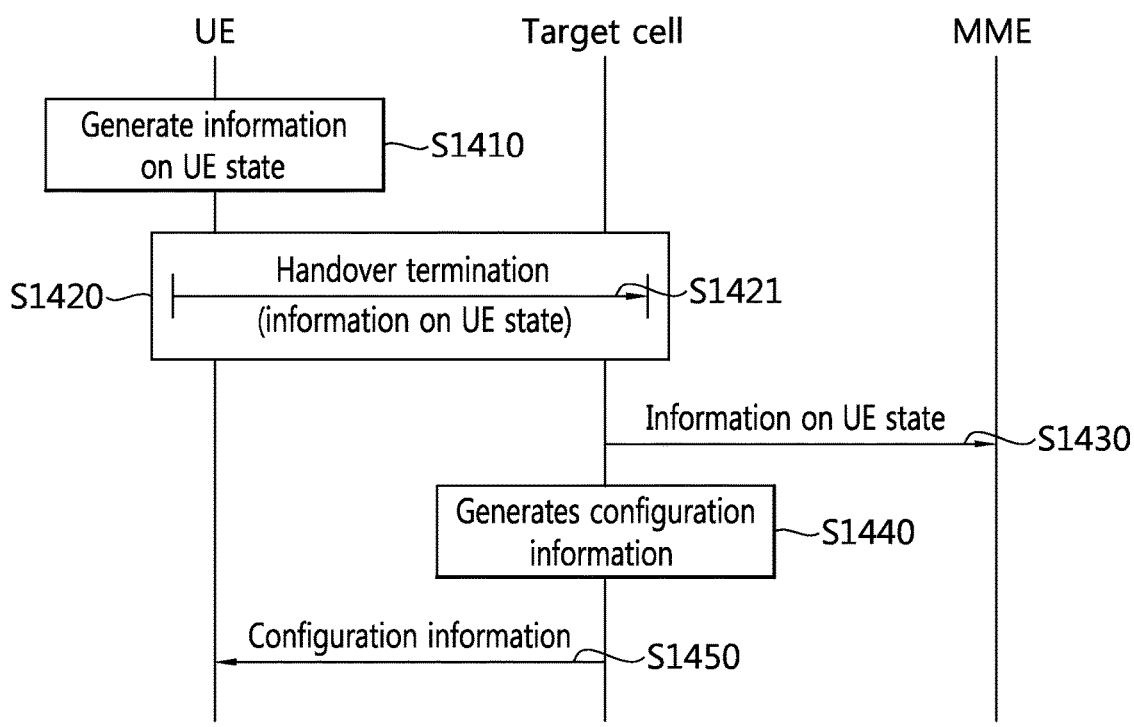
FIG. 14 is a diagram illustrating another example of the method of reporting information on UE state according to the embodiment of the present invention.

FIG. 14 is a diagram illustrating another example of the method of reporting information on UE state according to the embodiment of the present invention.

Referring to FIG. 14, the UE generates information on UE state (S1410). The generation of the information on UE state by the UE may include determining/estimating the activity of the UE and determining the activity state of UE according to the activity of the UE. The information on UE state may be implemented as illustrated in FIG. 11.

The UE may report the information on UE state during a handover of the UE (S1420). The UE may add the information on UE state to a handover termination message to be transmitted for terminating the handover to the target cell to transmit the handover termination message to the target cell (S1421).

The target cell may forward the acquired information on UE state to another network entity (S1430). For example, the target cell may forward the information on UE state according to a request from the MME.

The serving base station generates configuration information based on information on UE state (S1440), and transmits the generated configuration information to the UE (S1450). The configuration information may be implemented as illustrated in FIG. 11.

The terminal may perform an operation based on the configuration information acquired from the serving base station.

In accordance with the method of reporting information on UE state according to an embodiment of the present invention, the base station may recognize the activity of UE and/or the activity state of the UE through the information on UE state. Based on this, the network may generate configuration information by taking into consideration RRC configuration optimized in the UE and/or wireless resource assignment to provide the generated configuration information the UE. The UE may be operated according to the configuration information to perform an optimized RRC transition relation operation and to receive assignment of an optimized wireless resource. Accordingly, unnecessary signaling between the UE and the network may be and data transmission/reception quality of the UE is improved so that improved service may be provided. The UE may be operated according to the configuration information to perform an optimized RRC transition relation operation and to receive assignment of an optimized wireless resource. Accordingly, unnecessary signaling between the UE and the network may be and data transmission/reception quality of the UE is improved so that improved service may be provided.

Figure 15:
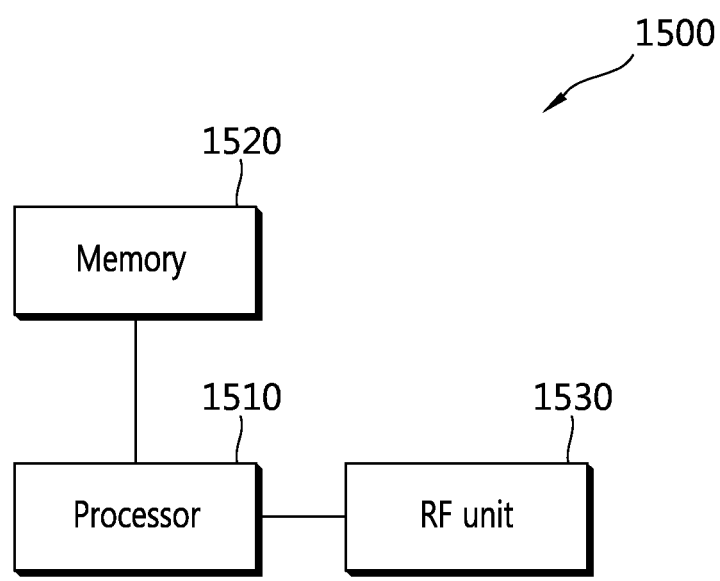
FIG. 15 is a block diagram illustrating a wireless apparatus according to an embodiment of the present invention.

FIG. 15 is a block diagram illustrating a wireless apparatus according to an embodiment of the present invention.

The wireless apparatus may be implemented by a UE and/or a network (base station or another network entity shown in FIGS. 11 to 14.

Referring to FIG. 15, the wireless apparatus 1500 includes a processor 1510, a memory 1520, and a radio frequency (RF) unit 1530. The processor 1510 performs the proposed functions, processes and/or methods. The processor 1510 may be configured to generate and transmit/receive state information and/or configuration information of UE. The processor 1510 may be configured to perform an operation based on the state information and/or configuration information of UE. The processor 1510 may be configured to implement the embodiment of the present invention with reference to FIGS. 11 and 14.

The RF unit 1530 is connected to the processor 1510, and sends and receives radio signals.

The processor may include an application-specific integrated circuit (ASIC), another chip set, a logic circuit and/or a data processing apparatus. The memory may include a read-only memory (ROM), a random access memory (RAM), a flash memory, a memory card, a storage medium, and/or other storage device. The RF unit may include a baseband circuit for processing the radio signal. When the exemplary embodiment is implemented by software, the aforementioned technique may be implemented by a module (a process, a function, and the like) performing the aforementioned function. The module may be stored in the memory and executed by the processor. The memory may be positioned inside or outside the processor and connected with the processor by various well-known means.

In the aforementioned exemplary system, methods have been described based on flowcharts as a series of steps or blocks, but the methods are not limited to the order of the steps of the present invention and any step may occur in a step or an order different from or simultaneously as the aforementioned step or order. Further, it can be appreciated by those skilled in the art that steps shown in the flowcharts are not exclusive and other steps may be included or one or more steps do not influence the scope of the present invention and may be deleted.

What is claimed is:

1. A method of transmitting information on a user equipment (UE) state in a wireless communication system, the method performed by UE and comprising:
generating information on a UE state;
transmitting, to a network, the information on the UE state, wherein the information on the UE state includes activity of the UE specifying a frequency at which the UE communicates with the network;
obtaining, from the network, configuration information in response to the information on the UE state; and
operating based on the configuration information,
wherein the activity of the UE is determined based on a continuation time during which the UE operates in a radio resource control (RRC) idle state immediately before operating in a RRC connection state, and
wherein the activity of the UE is determined based on at least one of an average RRC idle state continuation time and an average RRC connection state continuation time with respect to a specific number of RRC connection states.

2. The method of claim 1, wherein the activity of the UE is determined based on a number of transitions of a RRC state by the UE during at least one sub-frame.

3. The method of claim 1, wherein the activity of the UE is determined based on a number of active sub-frames for communication of the UE during a specific time interval.

4. The method of claim 1, wherein the activity of the UE is determined based on a rate of at least one active sub-frame for communication of the UE with respect to a number of latest specific sub-frames.

5. The method of claim 1, wherein the activity of the UE is determined based on whether traffic activated in the UE is delay sensitive traffic.

6. The method of claim 1, wherein the activity of the UE is determined based on a latest data transmission and reception generation time point of the UE.

7. The method of claim 1, wherein the configuration information comprises a parameter associated with a RRC state, and wherein the parameter is configured according to at least one of the activity state of the UE and the activity of the UE so that the UE is maintained in the RRC connection state or the RRC idle state.

8. The method of claim 7, wherein operating based on the configuration information comprises establishing a RRC connection with the network using the parameter.

9. The method of claim 1, wherein the configuration information comprises a discontinuous reception (DRX) parameter, and
the DRX parameter is configured so that a control channel monitoring time of the UE is controlled according to at least one of the activation state of the UE and the activity of the UE.

10. The method of claim 9, wherein operating based on the configuration information comprises:
monitoring a downlink control channel according to the control channel monitoring time of the UE which is specified according to the DRX parameter; and
performing data transmission/reception with the network according to scheduling information acquired through the downlink control channel.

11. The method of claim 1, further comprising:
transmitting a UE state information usable indicator indicating that there is information on the UE state to be reported; and
receiving a UE state information report request from the network,
wherein the information on the UE state is transmitted as a response to the UE state information report request.

12. A user equipment (UE) comprises:
a Radio Frequency (RF) unit that sends and receives radio signals; and
a processor functionally coupled to the RF unit that:
generates information on a UE state;
controls the RF unit to transmit, to a network, the information on the UE state, wherein the information on the UE state includes activity of the UE specifying a frequency at which the UE communicates with the network;
obtains, from the network, configuration information in response to the information on the UE state; and
operates based on the configuration information,
wherein the activity of the UE is determined based on a continuation time during which the UE operates in a radio resource control (RRC) idle state immediately before operating in a RRC connection state, and
wherein the activity of the UE is determined based on at least one of an average RRC idle state continuation time and an average RRC connection state continuation time with respect to a specific number of RRC connection states.

13. The method of claim 1, wherein the information on the UE state further includes an activity state of the UE determined based on the UE activity.

\* \* \* \* \*